(12) United States Patent
Ko et al.

(10) Patent No.: US 10,439,678 B2
(45) Date of Patent: *Oct. 8, 2019

(54) METHOD AND SYSTEM FOR TRANSFERING DATA BETWEEN PLURALITY OF DEVICES

(71) Applicant: SAMSUNG ELECTRONICS CO., LTD., Suwon-si (KR)

(72) Inventors: Jae-woo Ko, Uiwang-si (KR); Ho-dong Kim, Seoul (KR); Hee-won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,395

(22) Filed: Nov. 16, 2018

(65) Prior Publication Data

US 2019/0089415 A1 Mar. 21, 2019

Related U.S. Application Data

(63) Continuation of application No. 15/462,251, filed on Mar. 17, 2017, now Pat. No. 10,135,495, which is a (Continued)

(30) Foreign Application Priority Data

Apr. 7, 2012 (KR) .................. 10-2012-0036407

(51) Int. Cl.
*H04M 1/725* (2006.01)
*H04L 29/08* (2006.01)
(Continued)

(52) U.S. Cl.
CPC ........... *H04B 5/0031* (2013.01); *H04L 51/10* (2013.01); *H04L 67/2804* (2013.01);
(Continued)

(58) Field of Classification Search
CPC combination set(s) only.
See application file for complete search history.

(56) References Cited

U.S. PATENT DOCUMENTS 8,082,321 B2   12/2011   Ho et al.
8,171,137 B1 *  5/2012   Parks .................... G06F 9/4856
                                                    705/6
(Continued)

FOREIGN PATENT DOCUMENTS

CN      101741423 A     6/2010
EP         2166732 A1   3/2010
WO    2013/033522 A1    3/2013

OTHER PUBLICATIONS

Communication dated Aug. 12, 2013 issued by the European Patent Office in corresponding Application No. 13162562.6.
(Continued)

*Primary Examiner* — Ganiyu A Hanidu
(74) *Attorney, Agent, or Firm* — Sughrue Mion, PLLC

(57) ABSTRACT

Provided are a method and system for transferring data between a plurality of devices. The method of transferring data from a first device to a second device includes: selecting at least one content; acquiring relevant information about the selected content; storing the acquired relevant information; and providing the second device with the stored relevant information when a communication channel is formed between the first device and the second device.

20 Claims, 12 Drawing Sheets

Related U.S. Application Data continuation of application No. 13/857,679, filed on Apr. 5, 2013, now Pat. No. 9,628,145.

(51) Int. Cl.
*H04L 12/58* (2006.01)
*H04W 4/80* (2018.01)
*H04W 4/50* (2018.01)
*H04B 5/00* (2006.01)
*H04M 1/2745* (2006.01)

(52) U.S. Cl.
CPC .......... *H04L 67/34* (2013.01); *H04M 1/7253* (2013.01); *H04W 4/50* (2018.02); *H04W 4/80* (2018.02); *H04M 1/274516* (2013.01); *H04M 1/72525* (2013.01); *H04M 2250/64* (2013.01)

(56) References Cited

U.S. PATENT DOCUMENTS

| | | | |
|---|---|---|---|
| 2002/0088010 | A1 | 7/2002 | Dudkiewicz et al. |
| 2003/0107750 | A1 | 6/2003 | Takamine et al. |
| 2004/0125403 | A1* | 7/2004 | Furst ................. G06Q 10/0875 |
| | | | 358/1.15 |
| 2006/0115239 | A1 | 6/2006 | Shimazaki et al. |
| 2008/0147798 | A1 | 6/2008 | Paalasmaa et al. |
| 2008/0278408 | A1 | 11/2008 | Strickland et al. |
| 2009/0103124 | A1 | 4/2009 | Kimura et al. |
| 2010/0058061 | A1 | 3/2010 | Folta et al. |
| 2010/0071014 | A1* | 3/2010 | Brown ................... H04N 7/173 |
| | | | 725/110 |
| 2010/0130125 | A1 | 5/2010 | Numi |
| 2010/0235285 | A1* | 9/2010 | Hoffberg .............. G06Q 20/401 |
| | | | 705/75 |
| 2010/0251284 | A1 | 9/2010 | Ellis et al. |
| 2011/0058557 | A1 | 3/2011 | Satterlee et al. |
| 2011/0065384 | A1 | 3/2011 | Cader et al. |
| 2011/0106954 | A1 | 5/2011 | Chatterjee et al. |
| 2011/0131631 | A1 | 6/2011 | Ihori et al. |
| 2011/0181780 | A1* | 7/2011 | Barton ............... H04N 21/4126 |
| | | | 348/563 |
| 2011/0184862 | A1* | 7/2011 | Lanier .................. G06Q 20/102 |
| | | | 705/40 |
| 2011/0214133 | A1* | 9/2011 | Lum ....................... G06F 21/41 |
| | | | 719/318 |
| 2011/0276961 | A1 | 11/2011 | Johansson et al. |
| 2012/0021682 | A1* | 1/2012 | Tabaaloute .......... H04L 12/2812 |
| | | | 455/41.1 |
| 2012/0066419 | A1* | 3/2012 | Park .................... H04M 1/7253 |
| | | | 710/62 |
| 2012/0079541 | A1 | 3/2012 | Pan |
| 2013/0097239 | A1 | 4/2013 | Brown et al. |

OTHER PUBLICATIONS

Communitcation dated Jun. 27, 2013 issued by the International Searching Authority in corresponding Application No. PCT/KR2013/002849.

Communication dated May 19, 2017, issued by the State Intellectual Property Office of the People's Republic of China in counterpart Chinese Patent Application No. 201380018961.9.

Communication dated Jun. 12, 2017, issued by the European Patent Office in counterpart European Patent Application No. 13162562.6.

Communication dated Sep. 6, 2017, issued by the State Intellectual Property Office of the People's republic of China in counterpart Chinese Patent Application No. 201380018961.9.

\* cited by examiner

FIG. 8

| CONTENT NAME /80 | KIND /81 | PRODUCER /82 | RUNNING TIME /83 | CAPACITY /84 | LINK INFORMATION OF CONTENT /85 | App. /86 | LINK INFORMATION OF APP. /87 | TRANSFER CONDITION /88 | TRANSFER TARGET /89 |
|---|---|---|---|---|---|---|---|---|---|
| AA.mpg | MOVING PICTURE | Kim | 30:00 | 20mb | http://www.xxx.com | Kplayer | http://app1.com | LOCATION: COMPANY 시간: 7:00 ~13:00 | 010-xxx-xxxx |
| BB.txt | DOCUMENT | Lee | - | 15kb | http://www.yyy.com | Notepad | http://app2.com | FRIENDS | 010-xxx-xxxx |

METHOD AND SYSTEM FOR TRANSFERING DATA BETWEEN PLURALITY OF DEVICES

CROSS-REFERENCE TO RELATED PATENT APPLICATION

This application is a Continuation of U.S. application Ser. No. 15/462,251 filed on Mar. 17, 2017, which is a Continuation of U.S. application Ser. No. 13/857,679 filed on Apr. 5, 2013, in the United States Patent and Trademark Office, now U.S. Pat. No. 9,628,145 issued on Apr. 18, 2017, which claims priority from Korean Patent Application No. 10-2012-0036407, filed on Apr. 7, 2012, in the Korean Intellectual Property Office, the disclosures of which are incorporated herein by reference in their entireties.

BACKGROUND

1. Field

Methods and apparatuses consistent with the exemplary embodiments relate to a method and system for transferring data from a first device to a second device, and more particularly to a method and system for transferring the content and metadata of the content that indicates a procedure to be performed on the content by the second device when the signal is received and the content is being displayed or reproduced.

2. Description of the Related Art

Content may be shared among various devices. The content may be, for example, moving pictures, images, documents, schedules, telephone numbers, etc. Though the content may be shared, the devices may execute different kinds of applications for processing the content. Therefore, a technology for effectively transferring and executing content between devices is necessary.

SUMMARY

One or more exemplary embodiments provide a method and system for transferring data between a plurality of devices, which are capable of transferring information related to the content selected by a first device to a second device when a communication channel is formed between the first and second devices.

One or more exemplary embodiments also provide a method and system for transferring data between a plurality of devices, which are capable of transferring content selected by a first device to a second device when a local area communication channel is formed between the first and second devices.

One or more exemplary embodiments also provide a method and system for transferring data between a plurality of devices, which are capable of adaptively determining a communication channel through which data is transferred from a first device to a second device.

One or more exemplary embodiments also provide a method and system for transferring data between a plurality of devices, which are capable of determining an application for executing content received from a first device in a second device based on relevant information transferred from the first device.

According to an aspect of an exemplary embodiment, there is provided a method of transferring data from a first device to a second device, the method including: displaying or reproducing content on the first device; receiving, by the first device, a signal from the second device through near field communication (NFC) while displaying or reproducing the content; and transferring, from the first device to the second device, the content and metadata of the content that indicates a procedure to be performed on the content by the second device when (i) the signal is received and (ii) the content is being displayed or reproduced.

The metadata of the content may include an application that reproduces the content.

The procedure may include the second device displaying or reproducing the content using the application.

The second device may be a printer, and the procedure may include the printer printing the content.

The metadata of the content may include a link to an application that reproduces the content.

The procedure may include downloading the application, and the second device displaying or reproducing the content using the application.

The transferring may include transferring the content and metadata of the content using communication other than NFC.

The transferring may include determining a size of the content, selecting a communication protocol based on the size of the content, and transferring the content and metadata of the content using the communication protocol.

The selecting may include selecting the communication protocol based on the size of the content and a bandwidth of the communication protocol.

The transferring may include selecting a communication protocol, segmenting at least one of the content and metadata of the content based on the communication protocol, and transferring the segmented at least one of the content and metadata of the content using the communication protocol.

The method may further include verifying the second device in response to receiving the signal, and the transferring may include transferring the content and metadata of the content in response to verifying the second device.

The signal may include an identifier of the second device, and the verifying may include verifying the second device based on the identifier.

According to an aspect of an exemplary embodiment, there is provided a first device including a controller that displays or reproduces content on the first device, a communication unit that receives a signal from a second device through near field communication (NFC) while displaying or reproducing the content, and the controller transfers to the second device the content and metadata of the content that indicates a procedure to be performed on the content by the second device when (i) the signal is received and by the communication unit and ii) content is being displayed or reproduced by the controller.

According to an aspect of an exemplary embodiment, there is provided a system for transferring data between devices, comprising: a first device, a second device, and the first device displays or reproduces content, receives a signal from the second device through near field communication (NFC) while the first device is displaying or reproducing the content, and transfers the content and metadata of the content that indicates a procedure to be performed on the content by the second device when (i) the signal is received and (ii) the content is being displayed or reproduced, and the second device receives the metadata, parses the metadata, and performs the procedure on the content based on the parsed metadata.

BRIEF DESCRIPTION OF THE DRAWINGS

The above and other aspects will become more apparent by describing in detail exemplary embodiments with reference to the attached drawings in which:

FIG. 8 is a diagram showing an example of a relevant information table according to an exemplary embodiment;

DETAILED DESCRIPTION OF EXEMPLARY EMBODIMENTS

Figure 1:
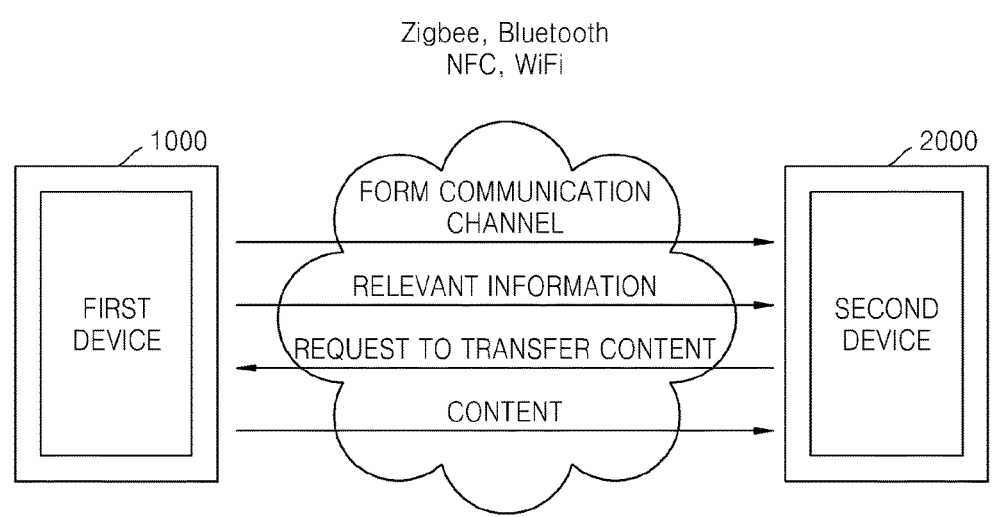
FIG. 1 is a conceptual view of a system for transferring data from a first device to a second device, according to an exemplary embodiment.

Exemplary embodiments will now be described with reference to the accompanying drawings. The exemplary embodiments may, however, be embodied in many different forms and should not be construed as being limited to the exemplary embodiments set forth herein; rather, these exemplary embodiments are provided so that this disclosure will be thorough and complete, and will fully convey the concepts discussed in the disclosure to those skilled in the art.

In the drawings, the same reference numbers refer to similar elements throughout the drawings.

In the present specification, it will be understood that when an element, such as a layer, a region, or a substrate, is referred to as being "connected to" or "coupled to" another element, the element may be directly connected or coupled to the other element or may be electrically connected while intervening elements may be present. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In the present specification, content denotes data that may be executed in a first device and a second device. The content may be, for example, music, moving pictures, images, documents, addresses, URL, data of applications, and objects included in various documents.

Also, in the present specification, a document may denote, for example, a text document, a word processing document, and a page of web browser, and objects included in the document may comprise at least one of images, texts, and moving pictures.

Also, in the present specification, relevant information about content is additional information relating to the content. The relevant information may be, for example, information about a name or identifier of content, a kind of content, a size of the content, a producer of the content, a running time of the content, a link to the content, application names reproducing the content, a link to the application, conditions for transferring the content between devices, and a transmission target of the content.

Also, in the present specification, a device may denote a smartphone, a mobile phone, a personal digital assistant (PDA), a laptop computer, a media player, a global positioning system (GPS) device, a TV, a printer, and other mobile or immobile computing devices, but the device is not limited thereto.

Also, in the present specification, the device may perform as at least as one of a transmitting device and a receiving device. For convenience of description, hereinafter, a transmitting device will be referred to as a first device and a receiving device will be referred to as a second device.

As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail below with reference to accompanying drawings.

FIG. 1 is a conceptual diagram of a system in which a first device 1000 transfers data to a second device 2000.

Referring to FIG. 1, the first device 1000 and the second device 2000 may he connected to each other over a communication channel via a plurality of communication units. The plurality of communication units may include at least one of, for example, Zigbee, near field communication (NFC), wireless fidelity (WIFI), and Bluetooth communication units.

The first device 1000 provides the second device 2000 with content and relevant information about the content. The first device 1000 may provide the second device 2000 with the relevant information about the content via the NFC unit, and may provide the second device 2000 with the content in response to a content transfer request received from the second device 2000. The first device 1000 may select the content that is to be transferred to the second device 2000 in advance, and may store information related to the selected content in advance. Also, the first device 1000 may adaptively select one or more of the communication units for transferring the content based on a kind of the content, a size of the content, and characteristics of the communication modes of the communication units, such as bandwidth of the communication modes.

Also, the second device 2000 may determine an application for executing the received content using the relevant information about the content transferred from the first device 1000. For example, the second device 200 may select one of video reproduction applications for reproducing video content, based on a characteristic of the video content and characteristics of the video reproduction applications.

When the first device 1000 communicates with the second device 2000 in a state and a user input for selecting the content is received, the first device 1000 may provide the second device 2000 with at least one of the content and the relevant information about the content.

The first device 1000 may determine whether to transfer the content or the relevant information about the content based on a location of the device, a current time, a size of the content, and the kind of the content.

The first device 1000 may determine whether to transfer the content or the relevant information about the content based on a state of the data transferring system. The state of the data transferring system may include, for example, a surrounding environment of the device, a state of a network including the device, and a resource state of the device, such as a battery state of the device. Also, the surrounding environment of the device may refer to weather and temperature of a space in which the device is located, a kind of peripheral or other device connected to the device, and kinds and numbers of applications executed in the device.

In addition, the first device 1000 may determine whether to transfer the content or the relevant information about the content based on circumstantial information of a user. The circumstantial information of the user may refer to, for example, the schedule of the user, a relationship between the user of the device and the user of the second device 2000, a health condition of the user, and the state of mind of the user. The circumstantial information about the user may be acquired from schedule information of the user stored in the first device 1000, sensing information about the user acquired from a sensor of the first device 1000, and user information about the user provided from another device, for example a server (not shown).

Figure 2:
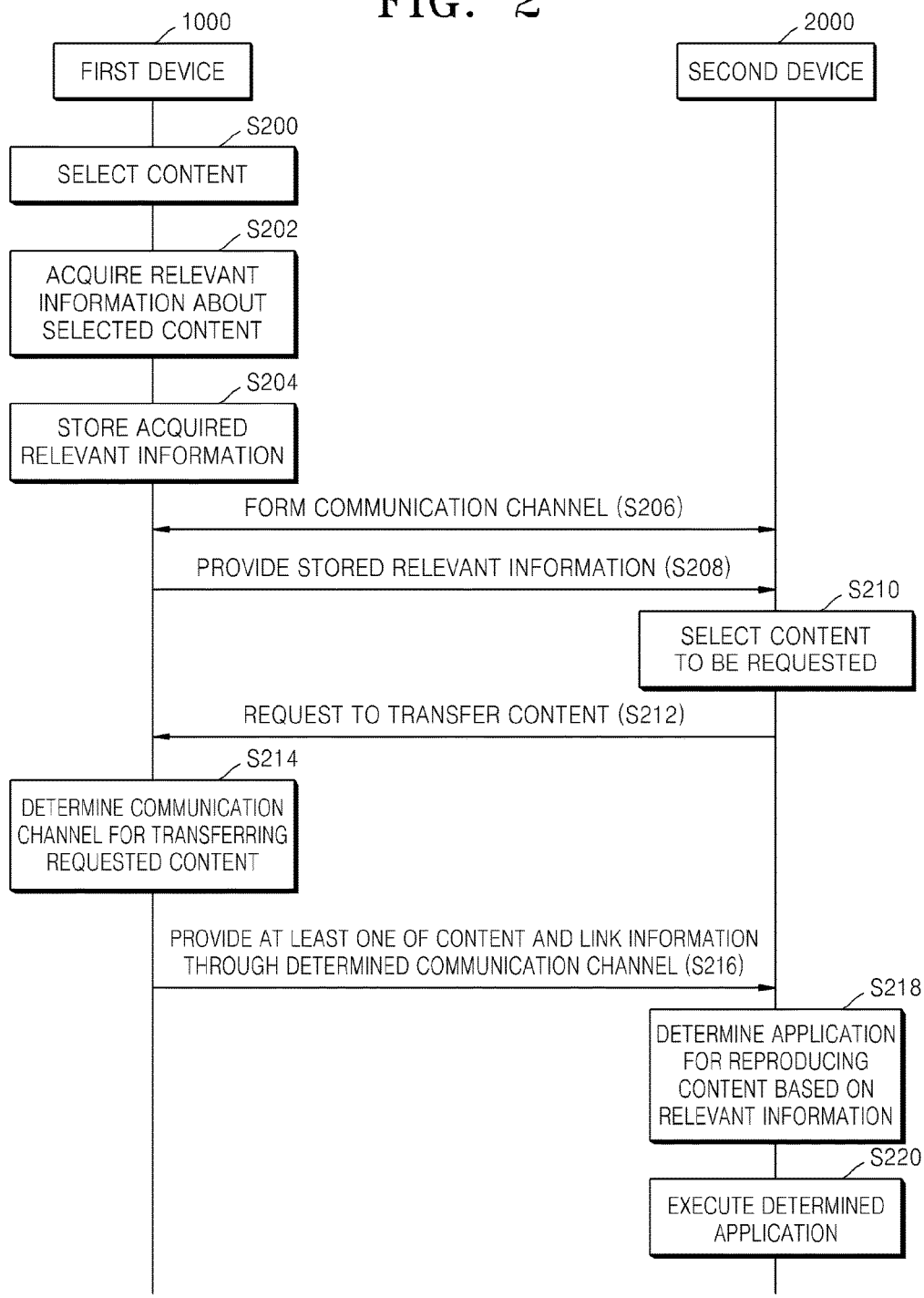
FIG. 2 is a flowchart illustrating a method of transferring data from a first device to a second device, according to an exemplary embodiment.

FIG. 2 is a flowchart illustrating a method of transferring data from the first device 1000 to the second device 2000, according to an exemplary embodiment.

Referring to FIG. 2, the first device 1000 transfers the relevant information about the content to the second device 2000, and in response to a content transfer request received from the second device 2000, the first device 1000 may transfer the content requested by the second device 2000 to the second device 2000.

In operation S200, the first device 1000 selects content to be provided to the second device 2000. The content selection may be performed prior to or contemporaneously with establishing communication with the second device 2000. The first device 1000 may select content that is being reproduced by the first device 1000 as the selected content to be provided to the second device. For example, when a moving picture is reproduced by the first device 1000 using a predetermined content reproducing application, the first device 1000 may select the reproduced moving picture as the content to be provided to the second device 2000. More specifically, if a file 'a.mpg' is reproduced by an image reproduction application 'A', the first device 1000 may select the file 'a.mpg' as the content to be provided to the second device 2000.

When communication is established and a communication channel is formed between the first device 1000 and the second device 2000, content that is being reproduced when the communication channel is formed may be selected by the first device 1000 as the content to be provided to the second device 2000.

Additionally, or alternatively, the first device 1000 may select the content to be provided to the second device 2000 based on a user input. In this case, a selection list may be displayed on the first device 1000, and the user may select content from the displayed selection list. The content selected from the displayed selection list may be the content selected to be provided to the second device 2000.

The first device 1000 may select a predetermined object included in a Web browser displayed on a screen to be the content to be provided to the second device 2000. The object may include, for example, text, an image, and a moving picture included in the Web browser displayed on the screen. If an object selected from the Web browser is selected, link information of an address at which the object is accessible over a network may be associated with the object and provided to the second device 2000. Alternatively, the first device 1000 may select a predetermined object included in a document file to be the content to be provided to the second device 2000.

The first device 1000 may select a transmission target to which the selected content is transferred. The transmission target may be a device associated with a user that is associated with an application. For example, when the first device 1000 selects the content, at least one of a phone book, a phone numbers list, and an address list stored in the first device 1000 may be displayed on the first device 1000. The first device 1000 may select at least one user in the phone book, the address list, or the phone numbers list and set a device associated with the selected user as the transmission target.

In operation S202, the first device 1000 acquires relevant information about the selected content. The relevant information about the content may include at least one of, for example, the name, the kind, the size, the producer of the content, the running time of the selected content, and link information to the selected content. The first device 1000 may acquire the relevant information about the selected content before the communication channel is formed between the first device 1000 and the second device 2000, but is not limited thereto.

The relevant information about the content may include application information about the application executing the selected content. The application information may include, for example, an identification of the application and link information to a location from which the application may be downloaded, but is not limited thereto.

In addition, the relevant information about the content may include information about transfer conditions for transferring the content. The transfer conditions may be set based on at least one of a location of the first device 1000, a location of the second device 2000, a transfer date of the content, a transfer day of the content, a transfer time of the content, the kind of the content, the size of the content, and a characteristics of available communication methods. For example, the transfer condition of the content may be set so that the first device 1000 transfers a moving picture file if the first device 1000 and the second device 2000 are connected to a secure network, such as a local area network of a business, and the transfer time of the content is in the morning of a business day. Also, the condition for transferring the content may be set based on a relationship between users of the first device 1000 and the second device 2000. For example, the condition for transferring the content may be set so that the first device 1000 transfers the content to the second device 2000 if the user of the first device 1000 and the user of the second device 2000 are friends, family, co-workers, etc. As such, the relationship between users may be stored on the first device 1000 as a list of users permitted to access content stored on the first device 1000. Alternatively, the relationship may be stored as a list of users that are prohibited from accessing the content stored on the first device 1000.

In operation S204, the first device 1000 stores acquired relevant information. The first device 1000 may store the acquired relevant information in a memory of the first device 1000, but is not limited thereto, and the relevant information may be stored in an another device, such as server or peripheral (not shown).

In operation S206, the first device 1000 forms a communication channel and establishes communication with the second device 2000. In operation S206, the first device 1000 may establish an NFC channel with the second device 2000. The first device 1000 may establish the NFC channel with the second device 2000 when the first device 1000 and the second device 2000 are within an NFC communication range of each other.

In operation S208, the first device 1000 provides the second device 2000 with the stored relevant information about the content. In particular, the first device 1000 extracts the relevant information about the content, from the memory, and transmits the extracted relevant information to the second device 2000. For example, when the content is selected in operation S200, the transmission target of the content may be determined. If the second device 2000 is a valid transmission target, in operation S208, the first device 1000 may identify the content and the relevant information about content that are to be provided to the second device 2000 from the information about the transmission target for the selected content. The relevant information for the content may be differently set based on the transmission target. For example, a first transmission target may be associated with a title of content, while a second transmission target may be associated with a link to the content. Accordingly, the relevant information for the content may be selectively provided.

In operation S208, the first device 1000 may provide the second device 2000 with the relevant information about the content through the communication channel formed in operation S206. In this case, the first device 1000 may convert the stored relevant information to a format suitable for transmission over the communication channel. For example, the first device 1000 may convert the stored relevant information to an NFC format suitable for transmission over the NFC channel.

If the size of the relevant information is large, the first device 1000 may split the relevant information into a plurality of smaller sized pieces and piecemeal transfer the split information to the second device 2000. Although communication may be established in operation S206 over a communication channel, the first device 1000 may provide the second device 2000 with the relevant information using a different communication channel.

In operation S210, the second device 2000 selects content that is to be requested from the first device 1000 based on the relevant information about the content received from the first device 1000. The second device 2000 may select the content based on predetermined user preference settings or in consideration of applications installed in the second device 2000. For example, the second device 2000 may only select content that is reproducible by applications currently installed on the second device 2000. Alternatively, the second device 2000 may display the relevant information on a screen of the second device 2000, and the user may select the content to be requested from the first device 1000 based on the displayed relevant information. For example, at least one of the name, the kind, the size, the producer, the running time of the content, the link information to the content, the application information of the content, and the conditions for transferring the content may be displayed on the screen of the second device 2000, and the user may select the content desired by the user to be provided from the first device 1000

Also, if the second device 2000 receives the relevant information about one particular content from the first device 1000, operation S210 may not be performed. In this case, the second device 2000 may simply request the first device 1000 to transfer the content that is associated with the relevant information about the one particular content. In operation S212, the second device 2000 may request the first device 1000 for the content matching to the received relevant information.

In addition, if the content that is to be requested by the second device 2000 is determined in advance, operation S210 may not be performed. Here, the second device 2000 may request to the first device 1000 for the content in response to receiving the relevant information of the predetermined content, without selecting the content.

In operation S212, the second device 2000 requests the first device 1000 to transfer the content. The second device 2000 may request the first device 1000 to transfer the content via the communication channel formed in operation S206. For example, the second device 2000 may request the first device 1000 to transfer the content via the NFC channel.

Also, in operation S212, the second device 2000 may provide the first device 1000 with information about a communication channel used by the second device 2000 for transferring the content to the second device 2000 while requesting the first device 1000 to transfer the content. In this case, the first device 1000 may determine the communication channel through which the content is to be transferred based on the received information about the communication channel used by the second device 2000 in operation S214. As discussed above, the communication channel for transferring the relevant information of the content may be different from the communication channel for transferring the content.

In operation S214, the first device 1000 determines the communication channel through which the requested content is to be transferred. In operation S214, the first device 1000 may determine the communication channel from among a plurality of communication channels. For example, the first device 1000 may select at least one of the Zigbee, the NFC, the Bluetooth, and the WIFI communication channels.

In addition, in operation S214, the first device 1000 may determine the communication channel based on at least one of the kind of the content and the size of the content. For example, if the size of the content is 20 KB or less, the first device 1000 may determine that the content will be transferred via the NFC channel. Otherwise, if the size of the content is greater than 20 KB, the first device 1000 may determine that the content will be transferred via at least one of the Zigbee, the Bluetooth, and the WIFI channels. As another example, if the kind of the content is text, the first device 1000 may determine that the content will be transferred via the NFC channel. Otherwise, if the kind of content is at least one of a moving picture and an image, the first device 1000 may determine that the content will be transferred via at least one of the Zigbee, the Bluetooth, and the WIFI channels.

Also, in operation S214, the first device 1000 may determine the communication channel through which the content is to be transferred based on a state of the communication network. For example, when a distance between the first device 1000 and the second device 2000 increases, an NFC channel between the first and second devices 1000 and 2000 may be disconnected, and the first device 1000 may determine that the content is to be transferred to the second device 2000 via at least one of the Zigbee, the Bluetooth, and the WIFI channels.

Also, in operation S214, the first device 1000 may determine the communication channel through which the content is to be transferred based on communication channel information previously transferred from the second device 2000.

However, the exemplary embodiment is not limited to the above examples, and the first device 1000 may transfer the content via a communication channel that is preset in operation S216, without performing the process of operation S214 for determining the communication channel.

In operation S216, the first device 1000 provides the second device 2000 with the requested content via the determined communication channel. If the first device 1000 is connected to the second device via the NFC channel, the first device 1000 may provide the second device 2000 with link information for downloading the content. Accordingly, the link information may be used by the second device 2000 to download the content using a different communication method.

In operation S212, the first device 1000 may receive from the second device 2000 information about one or more applications for executing the content requested by the second device 2000, and the first device 1000 may display a list of the one or more applications on the screen of the first device 1000, based on the information about the one or more applications. Also, the first device 1000 may display a list of the applications and the first device 1000 may receive a selection of a user of at least one application in the list, and may provide the second device 2000 with the content after converting the content into a format suitable for the selected application. For example, when the second device 2000 requests the first device 1000 to transfer content 'C.mpg', the second device 2000 may notify the first device 1000 that the applications available to the second device 2000 for executing the content 'C.mpg' may be an 'application #1' and an 'application #2'. The first device 1000 may display a list including the 'application #1' and the 'application #2' on the screen thereof, and may select the 'application #1' based on the user input. In addition, the first device 1000 may process the content to be suitable for the selected 'application #1' and provide the second device 2000 with the content. That is, the first device 1000 may convert the content into a file format that may be processed by the selected application.

The first device 1000 may also provide the second device 2000 with at least one of a control command for the second device 2000 to download the application for executing the content, a control command for the second device 2000 to execute the application about the content, and a control command for the second device 2000 to execute a predetermined operation of the application. In this case, the first device 1000 may receive information about kinds of control commands executed in the second device 2000 and kinds of applications installed in the second device 2000 from the second device 2000 in advance.

Also, the control command may be transmitted with the relevant information about the content to be provided to the second device 2000, or the control command may be provided to the second device 2000 with the content, but is not limited thereto. In operation S218, the second device 2000 determines the application to execute the received content based on the relevant information of the content. The second device 2000 identifies an identification value of the application executed in the first device 1000 from the relevant information about content, and may determine whether an application that is the same as the application executed in the first device 1000 is installed in the second device 2000. Also, the second device 2000 may determine whether an application that is compatible with the application executed in the first device 1000 is installed in the second device 2000. The second device 2000 may determine the application that is the same as or compatible with the application executed in the first device 1000 as the application for executing the received content.

If there is no application the same as or compatible with the application executed in the first device 1000 in the second device 2000, the second device 2000 may download an application for reproducing the content using the link information included in the relevant information of the content.

Also, the second device 2000 may determine the application for reproducing the content based on the type of the content. For example, if the content transferred from the first device 1000 is a phone book, the second device 2000 may determine a phone book application as the application for executing the phone book.

The exemplary embodiment is not limited thereto, and the second device 2000 may determine the application for executing the received content based on a user input. The second device 2000 may display a list of applications for executing the received content, and the second device 2000 may select a predetermined application from the list based on the user input.

In operation S220, the second device 2000 executes the application and reproduce the received content. Also, the second device 2000 may synchronize the application executed by the second device 2000 with the application of the first device 1000, and the synchronized applications may use various services for sharing the content with each other. For example, if the first device 1000 executes a file 'B.jpg' via a 'messenger application B' and provides the second device 2000 with the file 'B.jpg', the second device 2000 may determine the 'messenger application B' as the application for executing the received file 'B.jpg'. Also, the 'messenger application B' of the first device 1000 and the 'messenger application B' of the second device 2000 are synchronized with each other so that the first and second devices 1000 and 2000 may share contents with each other by using various services.

Also, when the second device 2000 receives at least one of the control command for the second device 2000 to download the application for executing the content, the control command for the second device 2000 to execute the application about the content, and the control command for the second device 2000 to perform a predetermined operation of the application from the first device 1000, the second device 2000 may execute the application or control the operation of the application according to the received control command.

For example, if the user selects 'americano' from a menu displayed on the screen of the first device 1000 at a coffee shop and the first device 1000 is within communication range of a shop terminal (not shown), the shop terminal (not shown) may receive order information and a control command for receiving the order from the first device 1000. Also, the shop terminal (not shown) may execute an application for receiving the order based on the control command and input the order information in the application so that the order of the user of the first device 1000 may be received.

Figure 3:
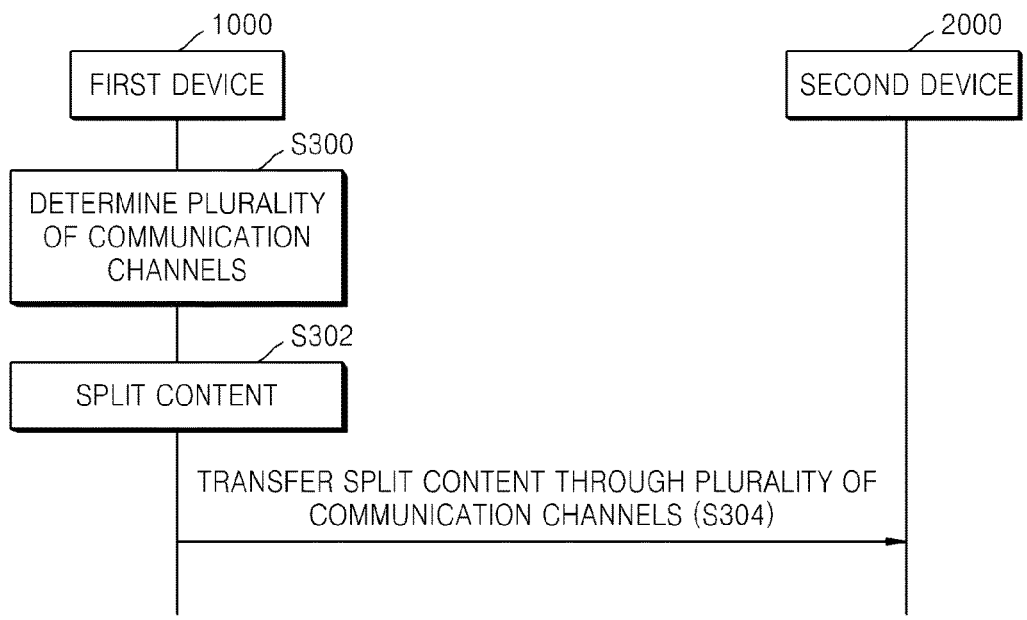
FIG. 3 is a flowchart illustrating a method of providing a second device with content from a first device via a plurality of communication channels, according to an exemplary embodiment.

FIG. 3 is a flowchart illustrating a method of providing the second device 2000 with content from the first device 1000 via a plurality of communication channels, according to an exemplary embodiment.

In operation S300, the first device 1000 determines a plurality of communication channels for transferring the content. Operation S300 may correspond to operation S214 described with reference to FIG. 2. The first device 1000 may determine the plurality of communication channels based on at least one of the kind and the size of the content. For example, the first device 1000 may determine that the content is transferred through at least one communication method among the NFC, Bluetooth, and the WIFI.

Also, in operation S300, the first device 1000 may determine the communication channel through which the content is to be transferred based on information about communication channels transferred from the second device 2000. The second device 2000 may provide the first device 1000 with the information about the communication channels that may be used by the second device 2000.

In operation S302, the first device 1000 divides the content into segments. In operation S302, the first device 1000 may divide the content into a plurality of segments, and each segment of content may be formatted and sized for transmission over each of the communication channels. For example, a first segment of the content may be transmitted over WiFi and a second segment of content may be transmitted over Bluetooth. Alternatively, the segments may be transmitted over a same communication channel. The first device 1000 may determine a size of the segmented content in consideration of a data transmission speed of the determined communication channels. The first device 1000 may generate combination information that is necessary for the second device to reassemble the split content.

In operation S304, the first device 1000 transfers the split content to the second device 2000 via the plurality of communication channels. Also, the first device 1000 may transfer the combination information about the split content to the second device 2000. The combination information may be transferred along with data of the split content.

In FIG. 3, the first device 1000 splits the content and transfers pieces of the content through the plurality of communication channels, but is not limited thereto. The first device 1000 may transfer the plurality of pieces of content through same or different communication channels. For example, the first device 1000 may transfer a moving picture file via WIFI communication, transfer an image file via Bluetooth communication, and transfer a document file via NFC. In this case, a priority order of the pieces of content with respect to the plurality of communication channels may be set in advance according to the kinds of the pieces of content.

Figure 4:
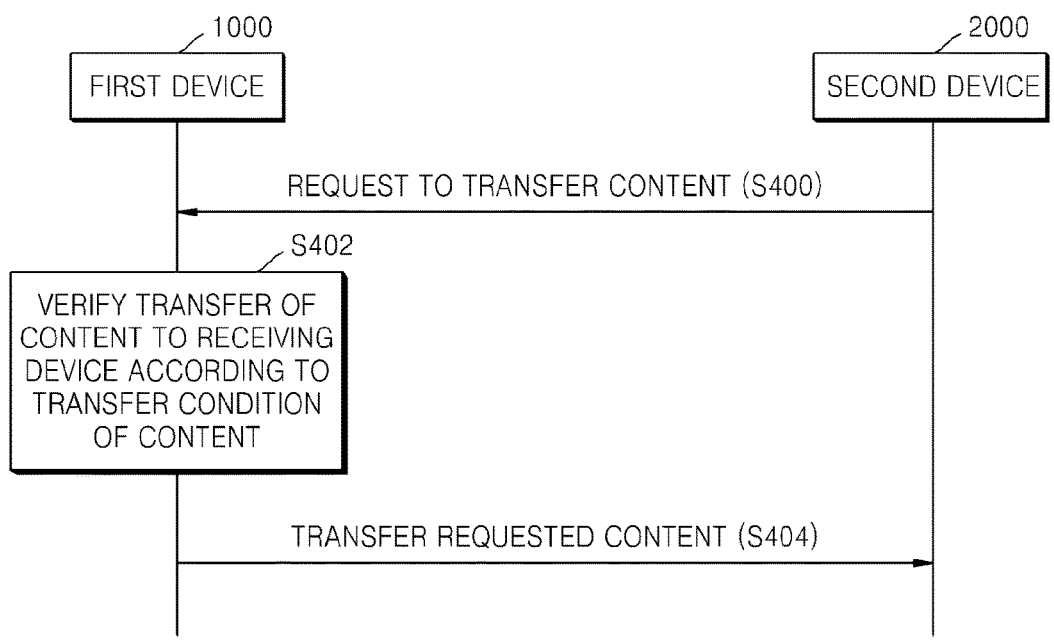
FIG. 4 is a flowchart illustrating a method of verifying a transfer of content from the first device to the second device, according to an exemplary embodiment.

FIG. 4 is a flowchart illustrating a method of verifying a transfer of content from the first device 1000 to the second device 2000, according to an exemplary embodiment.

In operation S400, the second device 2000 requests the first device 1000 to transfer the content. Operation S400 may correspond to operation S212 described with reference to FIG. 2. In operation S400, the second device 2000 may provide the first device 1000 with information about a physical location of the second device 2000 when requesting the content transmission.

In operation S402, the first device 1000 verifies the transfer request received from the second device 2000. In operation S402, the first device 1000 may determine to transfer the content to the second device 2000 based on at least one of the location of the first device 1000, the location of the second device 2000, the transfer date of the content, the transfer day of the content, the transfer time of the content, the kind of the content, the size of the content, and the types of available communication. The first device 1000 may verify the transfer of the content based on conditions for transferring content, which are set in advance, but is not limited thereto.

When the transfer request is verified in operation S402, the first device 1000 transfers the content to the second device 2000 in operation S404.

Figure 5:
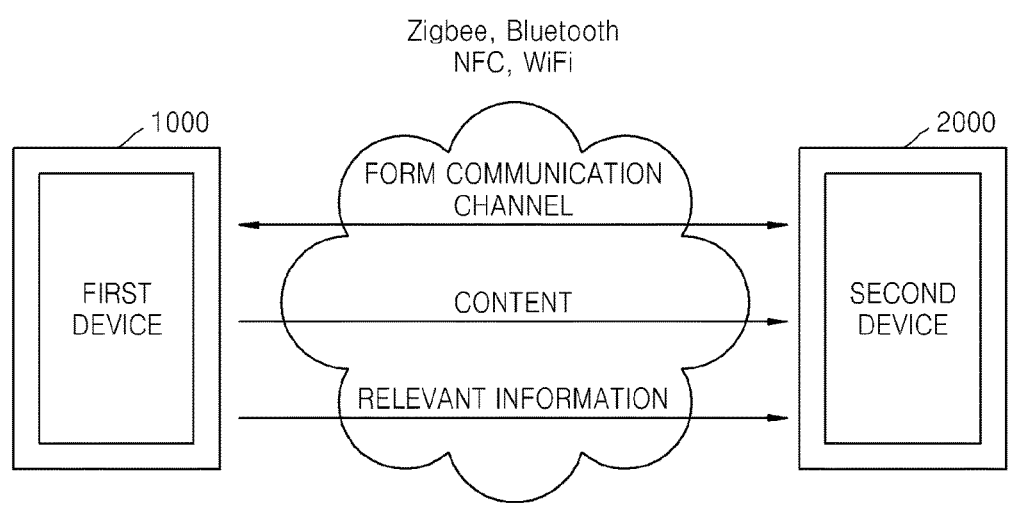
FIG. 5 is a conceptual view of a system for transferring data from a first device to a second device, according to an exemplary embodiment.

FIG. 5 is a conceptual view of a system for transferring data from the first device 1000 to the second device 2000, according to an exemplary embodiment.

As shown in FIG. 5, the data transferring system includes the first device 1000 and the second device 2000 connected to each other via a plurality of communication units. The plurality of communication units may include, for example, one of Zigbee, NFC, WIFI, and Bluetooth communication units.

When the first device 1000 and the second device 2000 form a communication channel therebetween, for example via the NFC unit, the first device 1000 may identify that the communication channel is formed and may provide the second device 2000 with content and relevant information about content. The first device 1000 may select the content to be provided to the second device 2000 in advance, and may store the relevant information about the selected content in advance. Also, the first device 1000 may adaptively select the communication unit for providing the content, based on the kind of the content and the size of the content.

Also, the second device 2000 may determine an application for executing the received content by using the relevant information transferred from the first device 1000.

If the first device 1000 is within a communication range of the second device 2000 in a state where a user input for selecting the content is maintained, the first device 1000 may provide the second device 2000 with at least one of the content and the relevant information about the content.

When the first device 1000 is within communication range of the second device 2000, the first device 1000 may provide the second device 2000 with at least one of the content and the relevant information about content.

The first device 1000 may determine whether the content is to be transferred or the relevant information is to be transferred, based on the location of the devices, a time, the size of the content, and the kind of the content.

In addition, the first device 1000 may determine whether the content is to be transferred or the relevant information is to be transferred based on a state of the data transferring system. The state of the data transferring system may include, for example, a surrounding environment of the device, a state of a network including the device, and a battery state of the device. Also, the surrounding environment of the device may include the weather and temperature of a place at which the device is located, a kind of peripheral connected to the device, a kind and the number of applications that are operating in the device, and a resource status of the device.

The first device 1000 may determine whether the content is to be transferred or the relevant information is to be transferred based on circumstantial information about the user. The circumstantial information about the user may include, for example, a schedule of the user, a relation of the user of the first device to the user of the second device 2000, a health condition of the user, and a state of mind of the user.

The circumstantial information about the user may be acquired from information about the schedule of the user stored in the first device 1000, sensing information about the user acquired from a sensor of the first device 1000, and user information received from an additional source, such as a server (not shown), but is not limited thereto.

Figure 6:
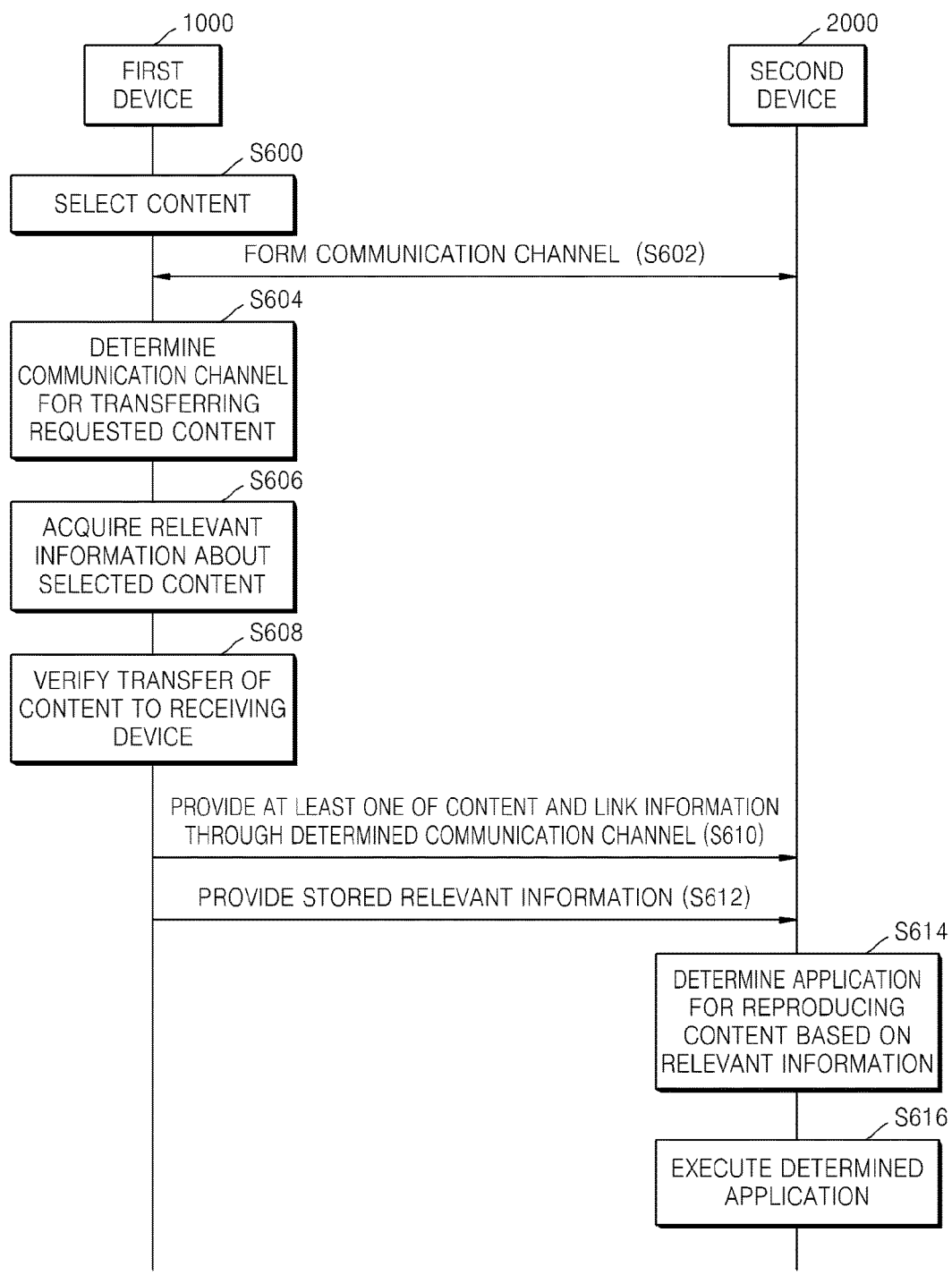
FIG. 6 is a flowchart illustrating a method of transferring data from a first device to a second device, according to an exemplary embodiment.

FIG. 6 is a flowchart illustrating a method of transferring data from the first device 1000 to the second device 2000, according to an exemplary embodiment.

Referring to FIG. 6, when communication is established and a communication channel is formed between the first device 1000 and the second device 2000, the first device 1000 may transfer content to the second device 2000 without receiving a content request from the second device 2000.

In operation S600, the first device 1000 selects the content to be provided to the second device 2000. The first device 1000 may select content that is being reproduced by the first device 1000. When content is reproduced through a predetermined application, the first device 1000 may select the content reproduced by the application as the content to be provided to the second device 2000. For example, when a file 'a.mpg' is reproduced through an 'image reproducing application A', the first device 1000 may select the file 'a.mpg' as the content to be provided to the second device 2000.

Since the communication channel is formed between the first device 1000 and the second device 2000 in operation 5602 the content may be selected by the first device 1000 prior to establishing the communication channel.

Also, in operation S600, the first device 1000 may select the content to be provided to the second device 2000 based on a user input. In this case, a selection list may be displayed on a display of the first device 1000, and the user may select content from the displayed selection list.

The first device 1000 may select a predetermined object included in a Web browser displayed on the screen of the first device 1000 to be the content to be provided to the second device 2000. In this case, link address information may be associated with the selected object, such that the object may be obtained by accessing a source using the link address information. The object may be, for example, text, images, and moving pictures included in the Web browser. Also, the first device 1000 may select a predetermined object included in a document file.

In addition, in operation S600, the first device 1000 may select a transmission target to which the selected content is to be transferred. For example, when the first device 1000 selects the content, at least one of a phone book, a phone numbers list, and an address list stored in the first device 1000 may be displayed on the first device 1000. The first device 1000 may select at least one user in the phone book, the address list, and the phone numbers list and set a device associated with the selected user as the transmission target.

In operation S602, a communication channel is formed between the first device 1000 and the second device 2000. In operation S602, the first device 1000 and the second device 2000 may form an NFC channel. For example, when the first device 1000 is within NFC communication range of the second device 2000, the first and second devices 1000 and 2000 may form an NFC channel.

In addition, in operation S602, the second device 2000 may provide the first device 1000 with information about the communication channels that may be used by the second device 2000 to transfer the content. In this case, the first device 1000 may determine the communication channel through which the content is to be transferred based on communication channel information received from the second device 2000 in operation S604.

In operation S604, the first device 1000 determines the communication channel that is used to transfer the content to the second device 2000. In operation S604, the first device 1000 may determine the communication channel through which the content is to be transferred from among a plurality of communication channels. For example, the first device 1000 may select at least one of the communication channels from among Zigbee, NFC, Bluetooth, and WIFI.

Also, in operation S604, the first device 1000 may determine the communication channel based on at least one of the kind of the content and the size of the content. For example, if the size of the content is equal to or less than 20 KB, the first device 1000 may determine that the content is transferred through an NFC channel. Also, for example, if the size of the content is greater than 20 KB, the first device 1000 may determine that the content is transferred through at least one of Zigbee, Bluetooth, and WIFI communication channels. For example, if the content is text, the first device 1000 may determine that the content is transferred through an NFC channel. If the content is at least one of a moving picture and an image, the first device 1000 may determine that the content is transferred through at least one of Zigbee, Bluetooth, and WWI communication channels.

In addition, in operation S604, the first device 1000 may determine a communication channel based on a state of a communication network. For example, when a distance between the first and second devices 1000 and 2000 increases and the NFC channel between the first and second devices 1000 and 2000 is disconnected, the first device 1000 may determine that the content is to be transferred through Zigbee, Bluetooth, and WIFI.

Also, in operation S604, the first device 1000 may determine the communication channel through which the content is transferred based on information about communication channels, which is previously transferred from the second device 2000.

in operation S606, the first device 1000 acquires relevant information about the content. The relevant information about the content may include, for example, at least one of a name, a kind, a size, a producer, a running time, and link information of the content. The first device 1000 may acquire the relevant information about the content before forming the communication channel between the first device 1000 and the second device 2000, but is not limited thereto.

The relevant information about the content may include information about an application executing the selected content. The information about an application may include, for example, an identification value of the application and link information for downloading the application, but is not limited thereto.

The relevant information about the content may include information about transfer conditions for transferring the content. The transfer conditions may be set based on at least one of a location of the first device 1000, a location of the second device 2000, a transfer date of the content, a transfer day of the content, a transfer time of the content, the kind of the content, the size of the content, and characteristics of available communication methods. For example, the transfer condition of the content may be set so that the first device 1000 may transfer a moving picture file if the first and second devices 1000 and 2000 are connected to a secure network, such as a local area network of a business, and the transfer time of the content is in the morning of a business day. Also, the condition for transferring the content may be set based on a relationship between users of the first device 1000 and the second device 2000. For example, the condition for transferring the content may be set so that the first device 1000 transfers the content to the second device 2000 in a case where the user of the first device 1000 and the user of the second device 2000 are friends or family. Also, in operation S606, the first device 1000 stores the acquired relevant information of the content. The first device 1000 may store the relevant information of the content in a memory of the first device 1000 or in a server or peripheral (not shown).

In operation S608, the first device 1000 may verify the transfer request received from the second device 2000. In operation S608, the first device 1000 may determine whether to transfer the content to the second device 2000 based on at least one of the location of the first device 1000, the location of the second device 2000, the transfer date of the content, the transfer day of the content, the transfer time of the content, the kind of the content, the size of the content, and the types of available communication. The first device 1000 may verify the transfer of the content based on conditions for transferring content, which are set in advance, but is not limited thereto.

In operation S610, the first device 1000 provides the second device 2000 with at least one of the content and the link information to the content via the determined communication channel. If the first device 1000 is connected to the second device 2000 via the NFC channel, the first device 1000 may provide the second device 2000 with the content when the NFC channel is formed without separately determining a communication channel. Also, when the first device 1000 is connected to the second device 2000 via the NFC channel, the first device 1000 may provide the second device 2000 with link information through the NFC channel from which the content may be downloaded by the second device 2000.

However, the exemplary embodiment is not limited thereto, and when the communication channel is established between the first device 1000 and the second device 2000 in operation S602, the first device 1000 may provide the second device 2000 with the selected content or the link information of the content through the communication channel. For example, when the first device 1000 is within communication range of the second device 2000 and the NFC channel is formed, the content that is being reproduced in the first device 1000 may be selected and provided to the second device 2000 through the NFC channel.

In operation S612, the first device 1000 provides the second device 2000 with the acquired relevant information of the content. The first device 1000 may extract the relevant information about the content provided the extracted relevant information about the content to the second device 2000.

The first device 1000 may process the relevant information to be in a format that is suitable for transmission over the communication channel. For example, the first device 1000 may process the relevant information to be in a format that is suitable for the NFC channel. Also, if the size of the relevant information is large, the first device 1000 may split the relevant information into a plurality of pieces and may transfer the pieces of relevant information to the second device 2000.

In operation S614, the second device 2000 may determine an application for reproducing the received content based on the relevant information of the content. The second device 2000 may identify the identification value of the application executed in the first device 1000 from the relevant information about the content, and may determine whether a same or similarly equivalent application is installed in the second device 2000. Also, the second device 2000 may determine whether an application compatible with the application executed in the first device 1000 is installed in the second device 2000. The second device 2000 may determine the application that is the same as or compatible with the application executed in the first device 1000 to be the application for reproducing the received content by the second device 2000.

If there is no application in the second device 2000 that is the same as or compatible with the application executed in the first device 1000, the second device 2000 may download the application for reproducing the content using the link information included in the relevant information of the content.

Also, in operation S614, the second device 2000 may determine the application for executing the content based on the kind of the received content. For example, if the content transferred from the first device 1000 is a phone book, the second device 2000 may determine a phone book application as the application for executing the phone book content.

The second device 2000 may also determine the application for executing the received content based on a user input.

In operation S616, the second device 2000 may execute the determined application and reproduce the content through the determined application. Also, the second device 2000 may synchronize the executed application with the application of the first device 1000, and the synchronized applications may use various services for sharing content with each other. For example, in a case where the first device 1000 may execute a file a 'B.jpg' by using a messenger application 'B' and provide the second device 2000 with the file 'B.jpg', the second device 2000 may determine the messenger application 'B' as the application for executing the received file 'B.jpg'. Also, the messenger application 'B' of the first device 1000 and the messenger application 'B' of the second device 2000 are synchronized with each other so that the first and second devices 1000 and 2000 may share the content with each other via various services.

Figure 7:
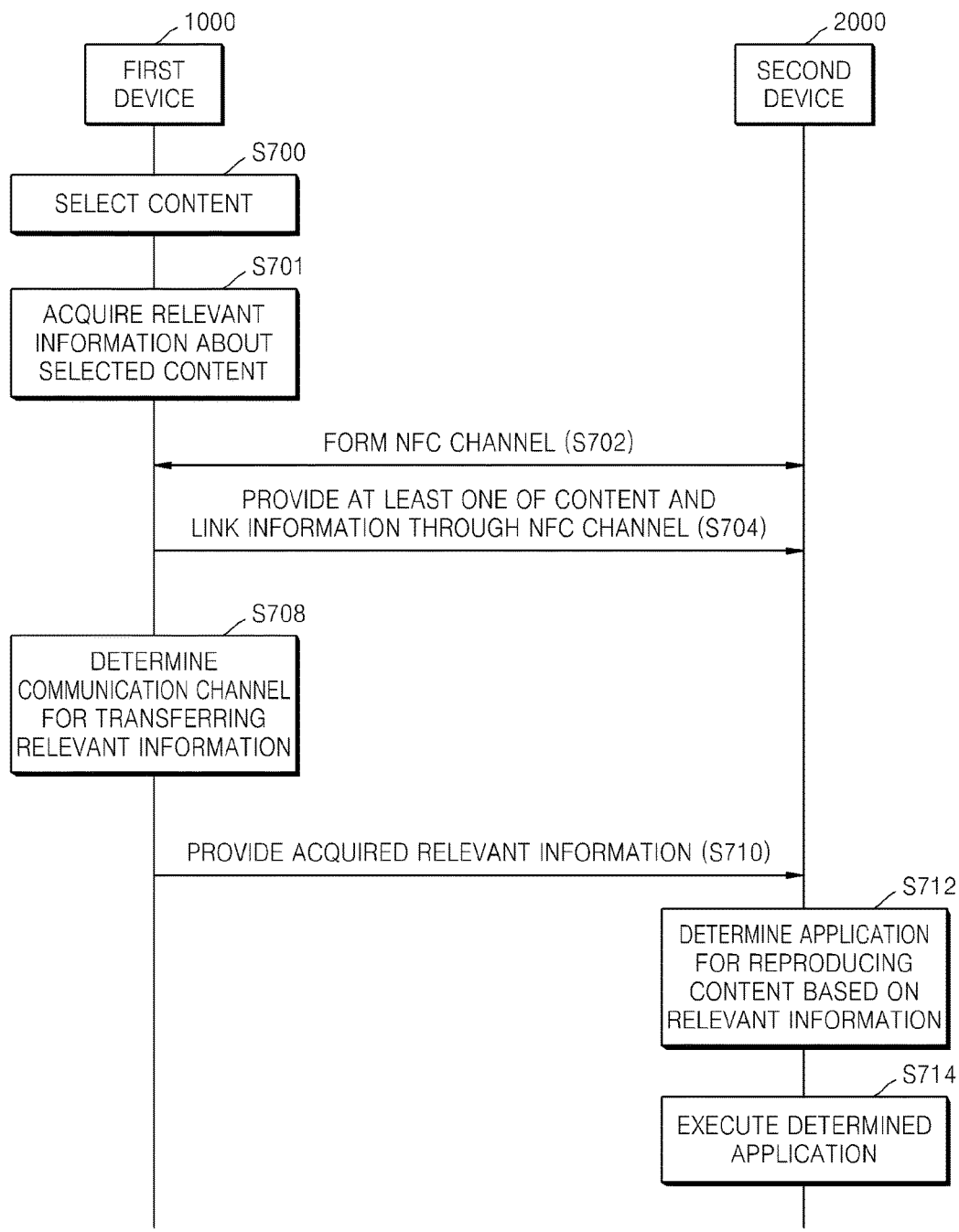
FIG. 7 is a flowchart illustrating a method of transferring data from a first device to a second device, according to an exemplary embodiment.

FIG. 7 is a flowchart illustrating a method of transferring data from the first device 1000 to the second device 2000, according to an exemplary embodiment.

In operation S700, the first device 1000 selects content to be provided to the second device 2000. The first device 1000 may select content that is being reproduced by the first device 1000. When the content (i.e., a moving picture or audio file) is reproduced through a predetermined application, the first device 1000 may select the reproduced moving picture or audio as the content to be provided to the second device 2000.

Also, in operation S700, the first device 1000 may select the content to be provided to the second device 2000 based on a user input. In this case, the first device 1000 may display a selection list, and a user may select a predetermined content from the displayed list as the content to be provided to the second device 2000. Also, the first device 1000 may select a predetermined object included in a Web browser displayed on the screen of the first device 1000, and link information may be associated with the selected object.

In operation S701, the first device 1000 may acquire relevant information about the content. The relevant information about the content may include at least one of, for example, a name, a kind, a capacity, a producer, a running time of the selected content, and link information to the selected content. The first device 1000 may acquire the relevant information about the selected content before the communication channel is formed between the first device 1000 and the second device 2000, but is not limited thereto.

Also, the relevant information about the content may include application information about the application for reproducing the selected content. For example, the application information may include, for example, an identification value of the application and link information about a link through which the application may be downloaded, but is not limited thereto.

In addition, the relevant information about the content may include information about transfer conditions for transferring the content. The transfer condition may be set based on at least one of a location of the first device 1000, a location of the second device 2000, a transfer date of the content, a transfer day of the content, a transfer time of the content, the kind of the content, the size of the content, and a kind of available communication units. Also, the transferring condition may be set based on a relationship between users of the first device 1000 and the second device 2000. In addition, in operation S701, the first device 1000 stores the acquired relevant information of the content. The first device 1000 may store the acquired relevant information of the content in the memory of the first device 1000 or in another device, such as a server (not shown).

In operation S702, the first device 1000 and the second device 2000 form an NFC channel. In the operation S702, when first device 1000 is within an NFC communication range of the second device 2000, the NFC channel may be formed between the first device 1000 and the second device 2000.

In operation S704, the first device 1000 provides the second device 2000 with at least one of the selected content and the link information of the content via the NFC channel. If a size of the content is equal to or less than a predetermined value, the first device 1000 may provide the second device 2000 with the content. But, if the capacity of the content is greater than the predetermined value, the first device 1000 may provide the second device 2000 with the link information through which the content may be downloaded by the second device.

In operation S708, the first device 1000 determines a communication channel through which the relevant information is to be transferred. In the operation S708, the first device 1000 may determine the communication channel from among a plurality of communication channels. For example, the first device 1000 may select at least one of Zigbee, NFC, Bluetooth, and WIFI communication channels.

In the operation S708, the first device 1000 may determine the communication channel through which the relevant information of the content is to be transferred based on status of a communication network. For example, if distance between the first and second devices 1000 and 2000 increases, the NFC communication between the first and second devices 1000 and 2000 may be disconnected, and the first device 1000 may determine that the relevant information of the content is to be transferred through at least one of the Zigbee, Bluetooth, and WIFI to the second device 2000.

In operation S710, the first device 1000 may obtain and transmit the relevant information of the content to the second device 2000. Also, in the operation S710, the first device 1000 may convert the relevant information of the content to be in a format that is suitable for the NFC channel. Also, if the size of the relevant information is large, the first device 1000 may split the relevant information into a plurality of pieces and transfer the split information to the second device 2000.

In operation S712, the second device 2000 determines an application for reproducing the received content based on the relevant information. The second device 2000 may identify the identification value of the application executed in the first device 1000 from the relevant information, and may determine whether an application the same as the application executed in the first device 1000 is installed in the second device 2000. Also, the second device 2000 may determine whether an application compatible with the application executed in the first device 1000 is installed in the second device 2000. The second device 2000 may determine the application that is the same as or compatible with the application executed in the first device 1000 to be the application for reproducing the received content by the second device 2000.

If an application that is the same as or compatible with the application executed in the first device 1000 is not installed in the second device 2000, the second device 2000 may download an application for reproducing the content using the link information included in the relevant information.

Also, in operation S712, the second device 2000 may determine the application for executing the content based on a kind of received content or may determine the application for executing the received content based on a user input.

In operation S714, the second device 2000 executes the determined application and process the content using the determined application. Also, the second device 2000 may synchronize the executed application with the application of the first device 1000, and the synchronized applications may use various services to share the content with each other.

FIG. 8 is a diagram showing an example of a relevant information table according to an exemplary embodiment.

As shown in FIG. 8, the relevant information table includes various fields, such as: a content name 80, a kind 81, a producer 82, a running time 83, a size 84, link information for the content 85, an application 86, link information to the application 87, a transfer condition 88, and a transfer target 89.

A name of the content selected by the first device 1000 is recorded in the content name 80. For example, 'AA.mpg' or 'BB.txt' may be recorded. The kind of the selected content is recorded in the kind 81 field. For example, a 'moving picture' or 'document' may be recorded, or a file extension may be recorded. Information about the producer of the content is recorded in the producer 82 field, and a running time (i.e., playback length) of the content is recorded in the running time 83 field. If the content is a moving picture or a music file, a predetermined time value may be recorded in the running time 82. Also, a size of the content file is recorded in the capacity 84, and information about the link for downloading the content is recorded in the link information about the content 85 field.

The name of the application for executing the content in the first device 1000 may be recorded in the application 86 field, but information about an application that may execute the content may be recorded in the application 86 field even if the application is not an application executed in the first device 1000. Information about the link for downloading the application may be recorded in the link information of the application 87 field.

Information about the condition for providing the second device 2000 with the content from the first device 1000 is recorded in the transfer condition 88. The condition may be with respect to at least one of the location of the first device 1000, the location of the second device 2000, and the transfer time. For example, the condition may be recorded in the transfer condition 88 so that the content 'AA.mpg' may be transferred when the first device 1000 is connected to a secure network of a company or the first device 1000 is within a company building and a current time for performing the transfer is within a range of 7:00 to 13:00. An identification value of the second device 2000 that is a target to which the content is provided is recorded in the transfer target 89. In the transfer target 89 field, a phone number, for example, of the second device 2000 may be recorded.

Such relevant information about the content may be displayed on a screen of the second device 2000 when the second device 2000 requests the first device 1000 to transfer a predetermined content. For example, the user of the second device 2000 may identify the name, kind, running time, and producer of the content from the relevant information displayed on the screen of the second device 2000 and may select a predetermined content, and the second device 2000 may request the first device 1000 to transfer the selected content.

Also, the relevant information about the content may be used to select the kind of the communication channel through which the first device 1000 transfers the content to the second device. The first device 1000 may determine the communication channel through which the content is to be transferred based on the kind of the content, size of the content, and characteristics of available transmission methods. For example, the first device 1000 may determine that the content is to be transferred through WIFI if the kind of the content is a moving picture and the size of the content is large. Also, for example, the first device 1000 may determine that the content is to be transferred through an NFC channel if the kind of the content is a document file and the size of the content is small.

In addition, the relevant information of the content may be used when the second device 2000 determines the application for executing the content. The second device 2000 identifies the application used to execute the content in the first device 1000 based on the relevant information, and may operate the same application. Also, if the application used in the first device 1000 for executing the content is not installed in the second device 2000, the second device 2000 may download the application by using the link information or may execute an application compatible with the application used in the first device 1000.

Figure 9:
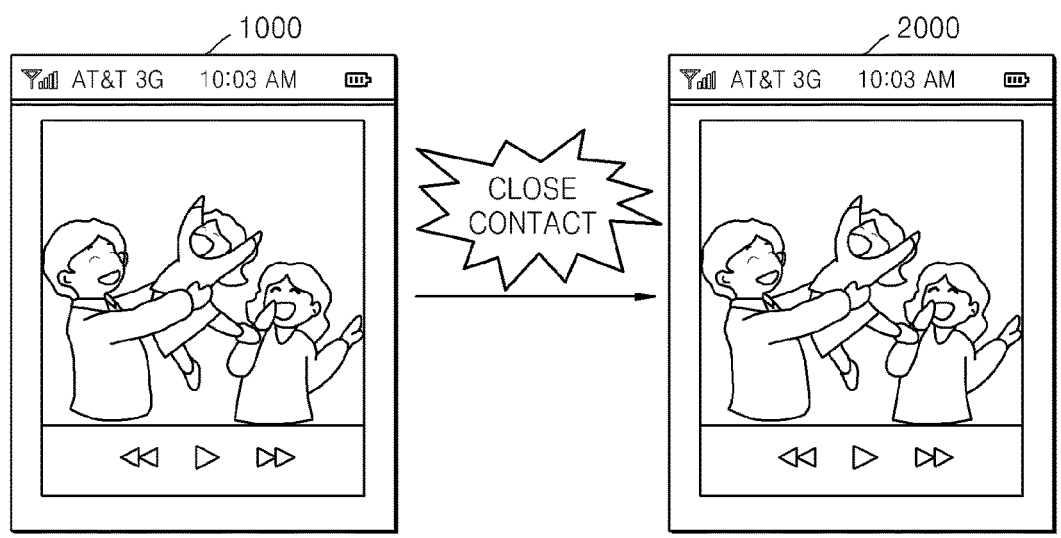
FIG. 9 is a diagram showing an example of transferring moving picture content from a first device to a second device, according to an exemplary embodiment.

FIG. 9 is a diagram showing an example of transferring moving picture content from the first device 1000 to the second device 2000, according to an exemplary embodiment.

Referring to FIG. 9, when the first device 1000 is within communication range of the second device 2000, a moving picture selected by the first device 1000 is provided to the second device 2000 so that the moving picture may be reproduced in the second device 2000. The first device 1000 may select the moving picture that is being reproduced, and may provide the second device 2000 with relevant information about the moving picture and the moving picture itself. The relevant information about the moving picture is provided to the second device 2000, and then, the moving picture may be selected by the second device 2000 based on the relevant information and request the first device 1000 to transfer the selected moving picture, and the first device may transfer the moving picture to the second device 2000. The first device 1000 may automatically provide the second device 2000 with the moving picture being reproduced by the first device when the first device 1000 approaches the second device 2000.

The first device 1000 may automatically request the second device 2000 to reproduce the moving picture transferred to the second device 2000 when the moving picture is transferred to the second device 2000. The request may indicate an application to reproduce the moving picture or the second device 2000 may select the application to reproduce the moving picture, as discussed above. As a result, the moving picture being reproduced on the first device 1000 may be automatically transferred and reproduced on the second device 2000 when the moving picture is being reproduced on the first device 1000 and the first device and the second device 2000 come within communication range of each other. The communication range may be an NFC communication range for performing NFC, as discussed above.

The first device 1000 may determine the communication channel, through which the moving picture is to be transferred, based on the kind and size of the moving picture. Also, the first device 1000 may determine the communication channel, through which the relevant information is to be transferred, based on the size of the relevant information.

Also, the second device 2000 may identify the application used in the first device 1000 that reproduces the content based on the relevant information about the moving picture, and may reproduce the moving picture by using the identified application.

Figure 10:
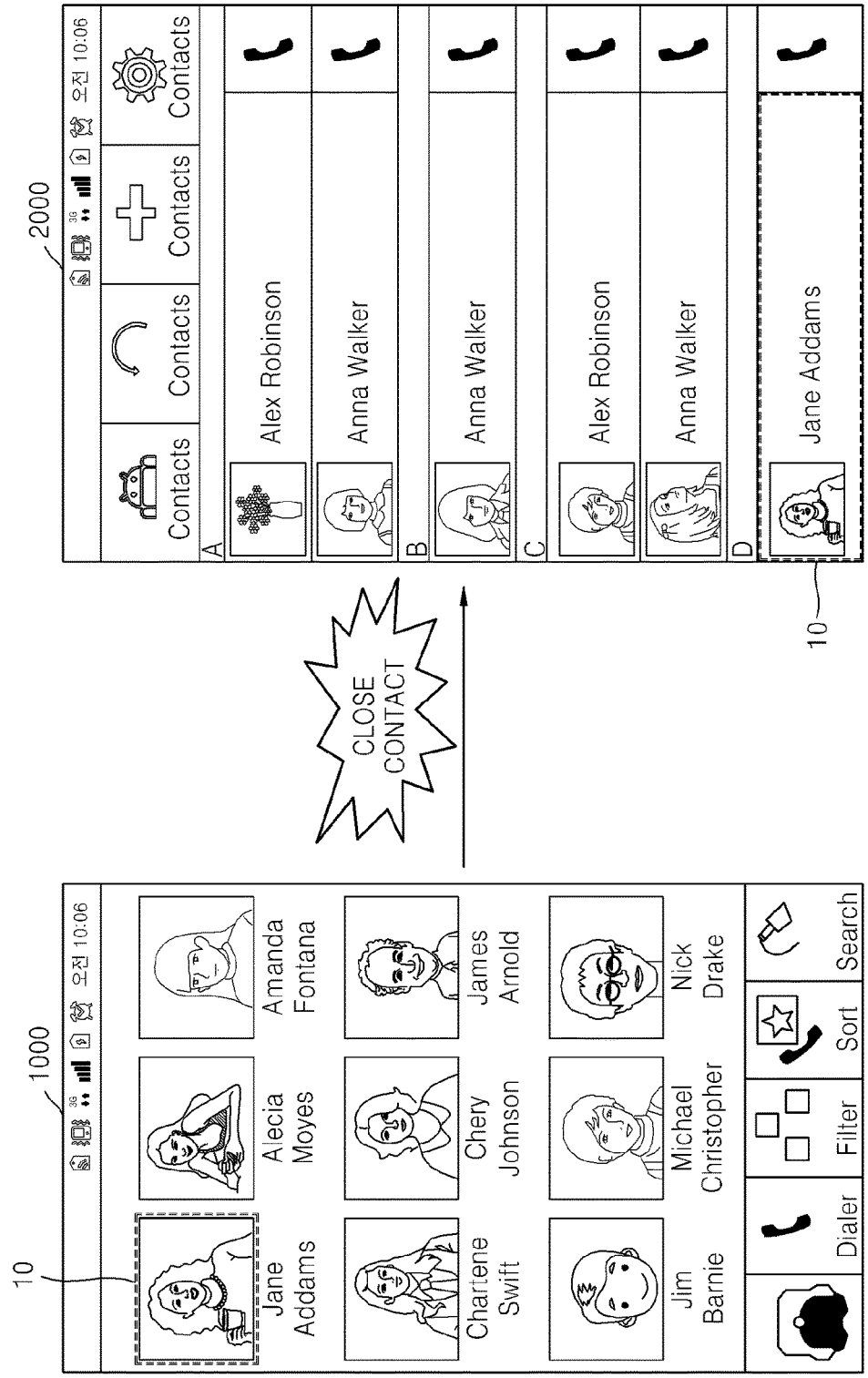
FIG. 10 is a diagram showing an example of transferring a telephone number from a first device to a second device, according to an exemplary embodiment.

FIG. 10 is a diagram showing an example of providing phone numbers to the second device 2000 from the first device 1000, according to an exemplary embodiment.

Referring to FIG. 10, when the first device 1000 is within communication range of the second device 2000, a user list 10 selected from the phone book of the first device 1000 is provided to the second device 2000 so that the user list 10 may be transferred from the first device 1000 to the second device 2000. If the phone book is being displayed by the first device 1000 when the second device 2000 comes within communication range and communication is established, the first device may determine that the phone book information is the data to be transferred. Thus, it may be determined that data of an active application is the data to be transferred. The first device 1000 may select the user list 10 in the phone book displayed on the first device 1000, and the selected user list 10 and relevant information about the user list may be transferred from the first device 1000 to the second device 2000.

Alternatively, the data to be transferred may only be a single entry in the user list 10.

The first device 1000 may automatically request the second device 2000 to store the entry or user list 10 transferred to the second device 2000 and display the entry or user list 10 when the entry or user list 10 is transferred to the second device 2000. The request may indicate an application in which to store the entry or user list or the second device 2000 may select the application in which to store the entry or user list, as discussed above. As a result, the user list 10 or entry being displayed on the first device 1000 may be automatically transferred and reproduced on the second device 2000 when the user list 10 is being reproduced on the first device 1000 and the first device and the second device 2000 come within communication range of each other. The communication range may be NFC communication range for performing NFC, as discussed above. Selection of the entry or the user list 10 may be performed based on whether the entry is selected when the first device 1000 and the second device 2000 come within communication range of each other. For example, if the entry is selected, then the entry is the content to be transferred and reproduced.

The first device 1000 may determine the communication channel, through which the user list 10 and the relevant information are to be transferred, based on the size of the user list 10 and the relevant information.

In addition, the second device 2000 may determine a phone book application for executing the received user list 10 based on the relevant information about the user list 10, and may execute the determined phone book application to add the user list 10 to the phone book.

In this case, the phone book application used in the first device 1000 and the phone book application used in the second device 2000 may be different. Also, the second device 2000 may analyze the information included in a user list transferred from the first device 1000, and may convert the information to be interpreted by the phone book application of the second device 2000 and add the user list to the phone book application of the second device 2000 using the converted information. Alternatively, the first device 1000 may convert the user list to be interpreted by the phone book application of the second device 2000 and provide the second device 2000 with the converted information user list information.

Figure 11:
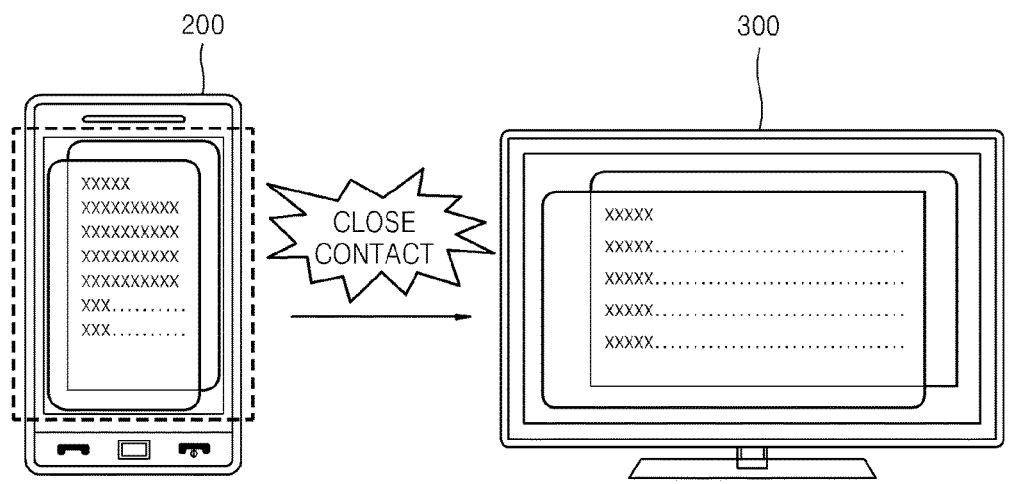
FIG. 11 is a diagram showing an example of transferring a document file from a mobile device to a display device, according to an exemplary embodiment.

FIG. 11 is a diagram showing an example of providing a TV 300 with a document file from a mobile device 200, according to an exemplary embodiment.

Referring to FIG. 11, when the mobile device 200 is within communication range of the TV 300, a document file may be displayed on the mobile device. The document file displayed on the mobile device when the mobile device 200 establishes communication with the television 300 may be selected by the mobile device 200 to be provided to the TV 300 so that the document file may be displayed on the TV 300. The mobile device 200 may select the document file that is being reproduced and may provide the TV 300 with relevant information about the document file and the document file. The relevant information about the document file is provided to the TV 300, and after the mobile device 200 transmits the document file to the TV 300.

The mobile device 200 may automatically request the TV 300 to reproduce the document file transferred to the TV 300 when the document file is transferred to the TV 300. The request may indicate an application to reproduce the document file or the TV 300 may select the application to reproduce the document file, as discussed above. As a result, the document file being reproduced on the mobile device 200 may be automatically transferred and reproduced on the TV 300 when the document file is being reproduced on the mobile device 200 and the mobile device 200 and the TV 300 come within communication range of each other. The communication range may be an NFC communication range for performing NFC, as discussed above.

The mobile device 200 may determine a communication channel, through which the document file is to be transferred, based on at least one of a kind of the file (i.e., document file, or file extension of the document file) and a size of the document file. Also, the mobile device 200 may determine the communication channel, through which the relevant information is to be transferred, based on a size of the relevant information.

Also, the TV 300 may identify an application used in the mobile device 200 to reproduce the document file based on the relevant information about the document file, and may execute the document file by using the identified application.

Figure 12:
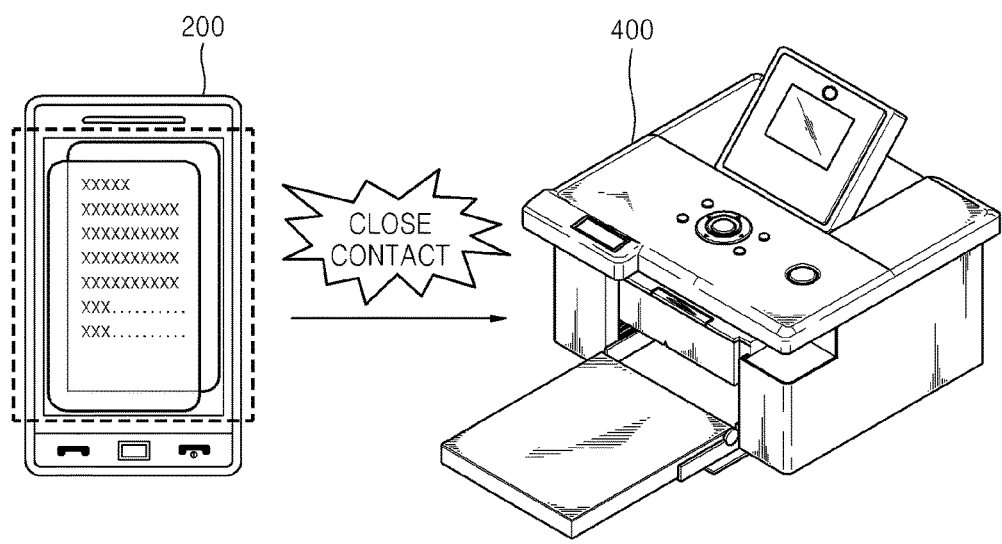
FIG. 12 is a diagram showing an example of transferring a document file from a mobile device to a printing device, according to an exemplary embodiment.

FIG. 12 is a diagram showing an example of transferring a document file from a mobile device 20 to a printer 400, according to an exemplary embodiment.

Referring to FIG. 12, when the mobile device 200 comes within communication range of the printer 400 and a document file is currently being displayed on the mobile device 200, a document file selected by the mobile device 200 to be provided to the printer 400 so that the document file may be printed by the printer 400. The mobile device 200 may select the document file that is being displayed when communication is established as the content to be provided to the printer 400, and may provide the printer 400 with relevant information about the document file and the document file when communication is established. The relevant information about the document file is provided to the printer 400, and after the document file selected by the printer 400 based on the relevant information may be provided from the mobile device 200 to the printer 400. As discussed above, the document file that is being executed by the mobile device 200 may be automatically provided to the printer 400 when the mobile device 200 approaches the printer 400.

The mobile device 200 may automatically request the printer 400 to output the document file transferred to the printer 400 when the document file is transferred to the printer 400. The request may indicate an application for outputting the document file or the printer 400 may select the application to output the document file, as discussed above. As a result, the document file being reproduced on the mobile device 200 may be automatically transferred and output by the printer 400 when the document file is being reproduced on the mobile device 200 and the mobile device 200 and the printer 400 come within communication range of each other. The communication range may be an NFC communication range for performing NFC, as discussed above.

The mobile device 200 may determine a communication channel, through which the document file is to be transferred, based on at least one of a kind and a size of the document file. Also, the mobile device 200 may determine the communication channel, through which the relevant information is to be transferred, based on a size of the relevant information.

Also, the printer 400 may identify an application used in the mobile device 200 based on the relevant information about the document file, and may use various services of the application when sharing the content with the mobile device 200 executing the functions of identified application.

Figure 13:
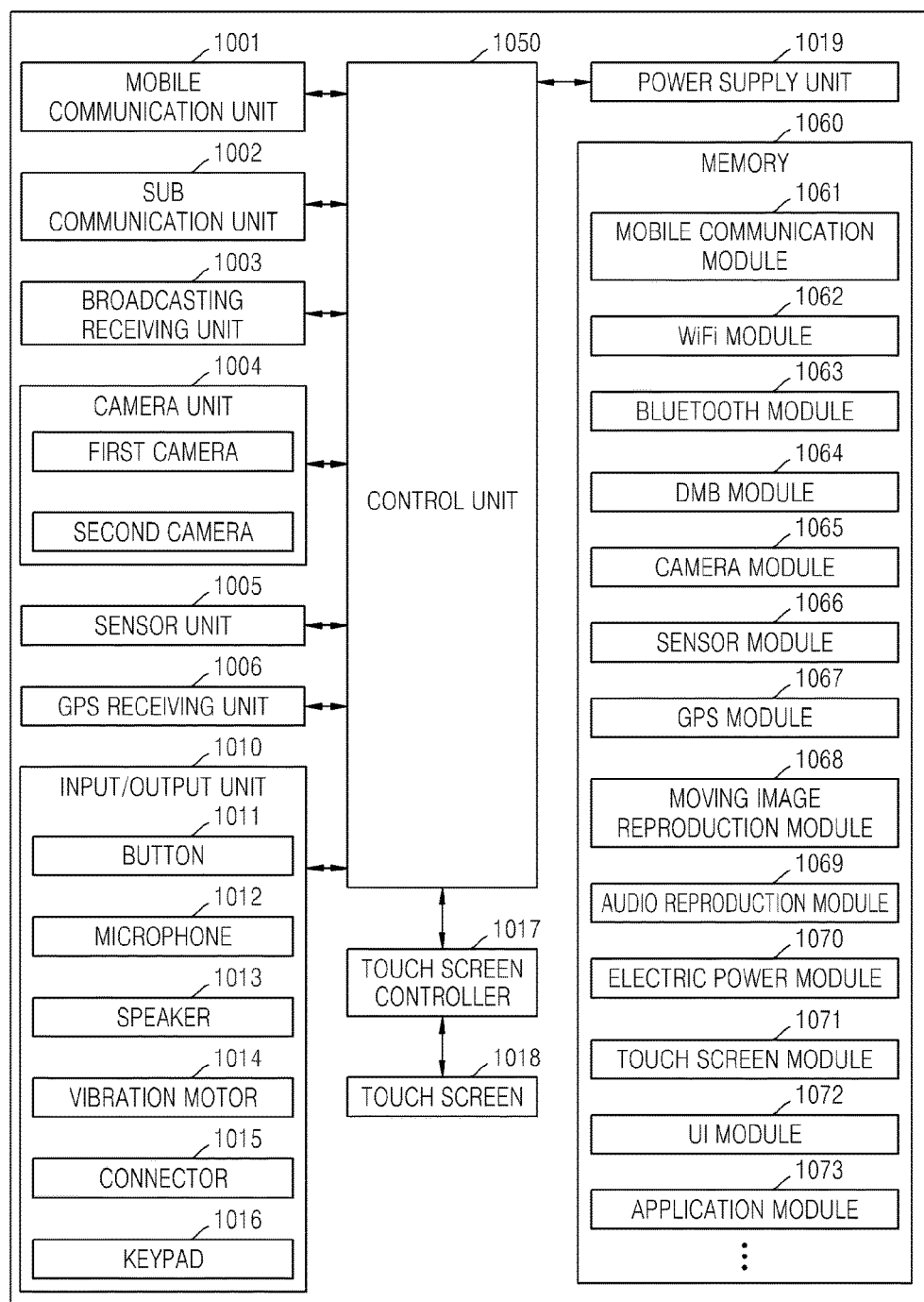
FIG. 13 is a diagram showing a configuration of a device for sharing data, according to an exemplary embodiment.

FIG. 13 is a diagram showing a configuration of a device for sharing data with other devices, according to an exemplary embodiment. The device shown in FIG. 13 may be the first device 1000 or the second device 2000 shown in FIG. 1.

A mobile communication unit 1001 may perform a call set-up with a base station and data communication via a cellular network such as 3Generation (3G)/4Generation (4G). A sub-communication unit 1002 performs communication, for example, NFC, Zigbee, WIFI, and Bluetooth. A broadcasting unit 1003 receives digital multimedia broadcasting (DMB) signals.

A camera unit 004 includes a lens for taking pictures or moving pictures, and optical devices.

A sensor unit 105 may include a gravity sensor for sensing motion of the device, an illumination sensor for sensing brightness of light, a proximity sensor for sensing proximity of a human being, and a motion sensor for sensing movement of a human being.

A global positioning system (GPS) receiver 1006 receives GPS signals from a satellite. Various services may be provided to the user via the GPS signals.

An input/output unit 1010 provides an interface with an external device or a human being. The input/output unit 1010 includes a button 2011, a microphone 1012, a speaker 1013, a vibration motor 1014, a connector 1015, and a keypad 1016.

A touch screen 1018 receives a touch input of the user. Also, a touch screen controller 1017 transfers the touch input that is input through the touch screen 1018 to a controller 1050. A power supply unit 1019 is connected to a battery or an external power source to supply electric power required by the device.

The controller 1050 executes programs stored in a memory 1060 to perform operations for data sharing according to the embodiment of the present invention.

The programs stored in the memory 1060 may be classified into a plurality of modules according to functions thereof, that is, a mobile communication module 1061, a WiFi module 1062, a Bluetooth module 1063, a DMB module 1064, a camera module 1065, a sensor module 1066, a GPS module 1067, a moving picture reproducing module 1068, an audio reproducing module 1069, a power source module 1070, a touch screen module 1071, a user interface (UI) module 1072, and an application module 1073. Also, the programs stored in the memory 1060 may be classified into a plurality of modules including a Zigbee communication module (not shown) and an NFC module (not shown) according to functions thereof.

Functions of each module may be intuitively construed by one of ordinary skill in the art from the names thereof, and each of the modules may correspond to a set of commands for performing one or more functions described with reference to FIGS. 1 through 12.

If the device is the first device 1000, the controller 1050 selects the content by using each of the modules, and may form a communication channel with the second device 2000. Also, the controller 1050 may generate relevant information about the content by using each of the modules, and may determine a communication channel for providing the content or the relevant information. Also, the controller 1050 may provide the second device 2000 with the content, link information about the content, and relevant information about the content through the determined communication channel.

Also, if the device is the second device 2000, the controller 1050 may select a content that will be requested by using each of the modules, and may request the first device 1000 to transfer the content. In addition, the controller 1050 may receive the content, the link information about the content, and the relevant information about the content from the first device 1000 by using each of the modules, and may execute the content via a predetermined application.

The controller 1050 may be a CPU or microprocessor or the like, and the memory 1060 may store programs for the processor to execute the operations of the FIGS. described above. Moreover, various functions of the device may be executed in hardware and/or software including one or more signal processing and/or application specified integrated circuits.

Figure 14:
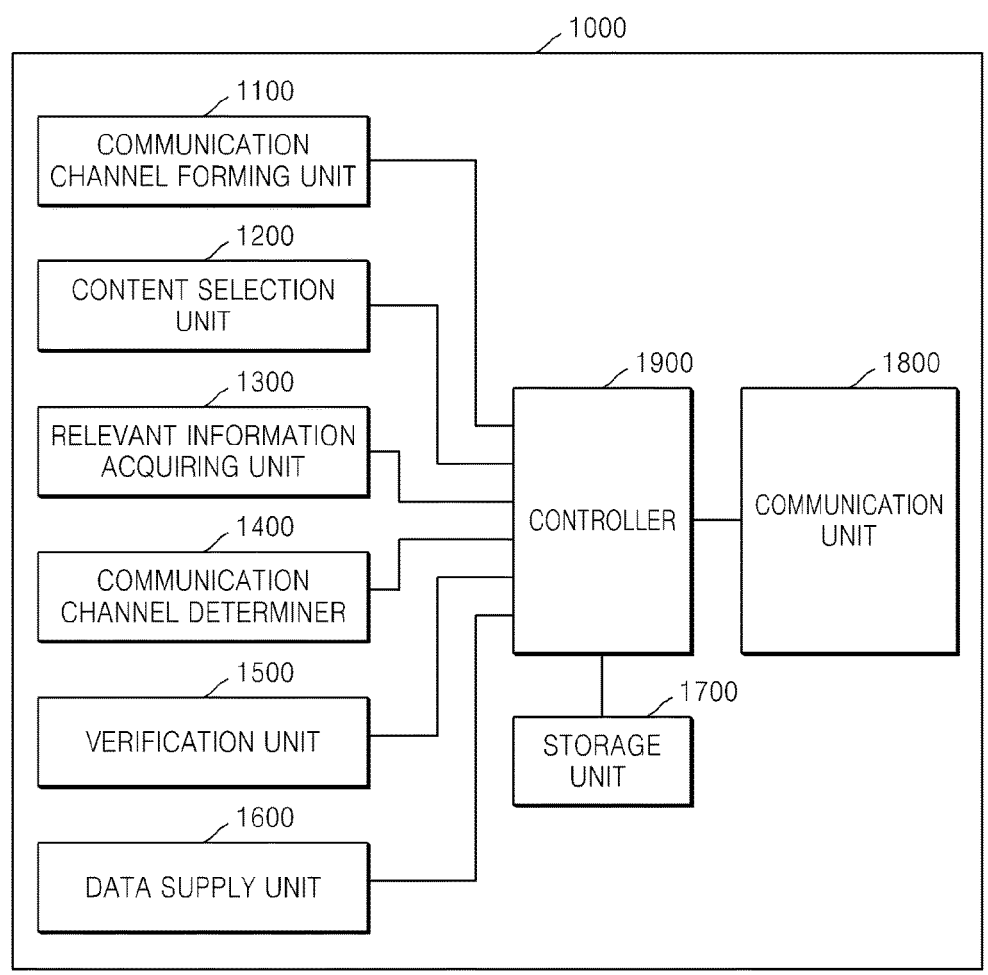
FIG. 14 is a block diagram of a device for sharing data according to an exemplary embodiment.

FIG. 14 is a block diagram of the first device 1000 according to an exemplary embodiment.

As shown in FIG. 14, the first device 1000 may include a communication channel forming unit 1100, a content selection unit 1200, a relevant information acquiring unit 1300, a communication channel determiner 1400, a verification unit 1500, a data supply unit 1600, a storage unit 1700, a communication unit 1800, and a controller 1900.

The communication channel forming unit 1100 forms a communication channel between the first device 1000 and the second device 2000. The first and second devices 1000 and 2000 may be connected to each other via a plurality of communication units. The plurality of communication units may include, for example, at least one of ZigBee, NFC, WIFE, and Bluetooth communication units. For example, the communication channel forming unit 1100 may form an NFC channel with the second device 2000 when the first device 1000 approaches within an NFC communication range of the second device 2000.

The content selection unit 1200 may select content to be provided to the second device 2000. The content selection unit 1200 may select content that is being executed in the first device 1000. If a moving picture is reproduced through a predetermined application in the first device 1000, the content selection unit 1200 may select the moving picture that is being reproduced as the content to be provided to the second device 2000. For example, if a file 'a.mpg' is reproduced by an 'image reproducing application A', the content selection unit 1200 may select the file 'a.mpg' as the content to be provided to the second device 2000.

Also, since the communication channel is formed between the first and second devices 1000 and 2000, the content selection unit 1200 may select the content that is being executed when the communication channel is formed.

In addition, the content selection unit 1200 may select the content to be provided to the second device 2000 based on the user input. In this case, the first device 1000 may display a selection list, and the user may select a predetermined content from the displayed list as the content to be provided to the second device 2000. Also, the content selection unit 1200 may select a predetermined object included in a Web browser displayed on the screen. In this case, predetermined link information may be associated with to the selected object. The object may include, for example, text, an image, and a moving picture included in the Web browser. Also, the first device 1000 may select a predetermined object included in a document file.

Also, the content selection unit 1200 may select a transfer target to which the selected content will be transferred when selecting the content. When the content selection unit 1200 selects the content, at least one of the phone book, address book, and the phone numbers stored in the first device 1000 may be displayed on the screen of the first device 1000. The content selection unit 1200 may select at least one of the users in the user list of the phone book, the address book, and the phone numbers so as to set a device matched to the selected user as the transfer target.

The relevant information acquiring unit 1300 may acquire the relevant information about the selected content. The relevant information about the content may include, for example, at least one of the a name, a kind, a size, a producer, a running time of the selected content, and link information to the selected content. The relevant information acquiring unit 1300 may acquire relevant information about the selected content before the communication channel is formed between the first device 1000 and the second device 2000, but is not limited thereto.

Also, the relevant information about the content may include application information about the application executing the selected content. The application information may include, for example, an identification value of the application and link information about a link for downloading the application, but is not limited thereto.

In addition, the relevant information about the content may include information about transfer conditions for transferring the content. The transfer conditions may be set based on at least one of a location of the first device 1000, a location of the second device 2000, a transfer date of the content, a transfer day of the content, a transfer time of the content, the kind of the content, the size of the content, and a kind of available communication method. For example, the transfer condition of the content may be set so that the first device 1000 transfers a moving picture file in a case where the first device 1000 and the second device 2000 are located in a company building and the transfer time of the content is in the morning of a business day. Also, the condition for transferring the content may be set based on a relationship between users of the first device 1000 and the second device 2000. For example, the condition for transferring the content may be set so that the first device 1000 transfers the content to the second device 2000 in a case where the user of the first device 1000 and the user of the second device 2000 are friends or family.

The communication channel determiner 1400 determines the communication channel for transferring the content. The communication channel determiner 1400 may determine the communication channel for transferring the content from among a plurality of communication channels. For example, the first device 1000 may select at least one of Zigbee, NFC, Bluetooth, and WIFI communication channels.

Also, the communication channel determiner 1400 may determine the communication channel based on at least one of the kind of the content and the size of the content. For example, if the size of the content is 20 KB or less, the first device 1000 may determine that the content will be transferred via an NFC channel. Otherwise, if the size of the content is greater than 20 KB, the first device 1000 may determine that the content will be transferred via at least one of ZigBee, Bluetooth, and WIFI channels. As another example, if the kind of the content is text, the first device 1000 may determine that the content will be transferred via an NFC channel. Otherwise, if the kind of content is at least one of a moving picture and an image, the first device 1000 may determine that the content will be transferred via at least one of ZigBee, Bluetooth, and WIFI channels.

Also, the communication channel determiner 1400 may determine the communication channel through which the content is to be transferred based on a state of the communication network. For example, when the first device 1000 and the second device 2000 are far apart from each other and the NFC channel is not possible, the first device 1000 may determine that the content is to be transferred to the second device 2000 via at least one of the Zigbee, the Bluetooth, and the WIFI channels.

In addition, the communication channel determiner 1400 may determine the communication channel through which the content is to be transferred based on communication channel information transferred from the second device 2000 earlier. Otherwise, the communication channel determiner 1400 may determine a plurality of communication channels from the second device 2000.

The verification unit 1500 verifies the transfer of content to the second device 2000. The verification unit 1500 may determine whether the content is transferred to the second device 2000 based on at least one of the location of the first device 1000, the location of the second device 2000, the transfer date of the content, the transfer day of the content, the transfer time of the content, the kind of the content, the size of the content, and the kind of available communication methods. The verification unit 1500 may verify the transfer request for the content based on conditions for transferring content.

The data supply unit 1600 provides the second device 2000 with at least one of the content and the relevant information about the content. The data supply unit 1600 may transfer at least one of the content and the relevant information about the content when the communication channel is formed between the first device 1000 and the second device 2000. Also, when a plurality of communication channels are determined, the data supply unit 1600 may split at least one of the content and the relevant information and transmit the pieces through different communication channels. If a plurality of communication channels are determined, the data supply unit 1600 may transfer the plurality of pieces of content through different communication channels.

The data supply unit 1600 may determine whether the content is to be transferred or the relevant information is to be transferred based on the location of the device, the size of the content, and the kind of the content.

Also, the data supply unit 1600 may determine whether the content is to be transferred or the relevant information is to be transferred based on a state of the data transfer system. The state of the data transfer system may include, for example, a surrounding environment of the device, a state of a network including the device, and a battery state of the device. Also, the surrounding environment of the device may refer to weather and temperature of a space where the device is located, a kind of peripheral connected to the device, kinds and number of applications executed in the device, and a resource state of the device.

Also, the data supply unit 1600 may determine whether the content is to be transferred or the relevant information is to be transferred based on circumstantial information about the user. The circumstantial information about the user may refer to, for example, the schedule of the user, a relationship of the user of the first device 1000 with a user of the second device 2000, the health condition of the user, and the state of mind of the user. The circumstantial information about the user may be acquired from schedule information of the user stored in the first device 1000, sensing information of a user acquired from a sensor of the first device 1000, and user information provided from an additional server (not shown), but is not limited thereto.

The data supply unit 1600 may provide the second device 2000 with the relevant information.

The data supply unit 1600 may extract the relevant information about the content that is to be provided to the second device 2000 from the memory, and the extracted relevant information of the content may be provided to the second device 2000. For example, when the content is selected, a transfer target of the content may be matched to the content, and the data supply unit 1600 may identify the content to be provided to the second device 2000 and the relevant information about the content from the information about the transfer target that is matched to the selected content.

Also, the data supply unit 1600 may provide the second device 2000 with relevant information through the formed communication channel. In this case, the data supply unit 1600 may process the stored relevant information to be in a format that is suitable for the communication channel. For example, the first device 1000 may process the stored relevant information to be suitable for the NFC channel. The data supply unit 1600 may split the relevant information into a plurality of pieces and transfer the relevant information to the second device 2000, if the size of the relevant information is large.

In addition, the data supply unit 1600 may provide the second device 2000 with the content. The data supply unit 1600 may transfer the content when the communication channel is formed between the first and second devices 1000 and 2000. Also, the data supply unit 1600 may transfer the content in response to the content transfer request from the second device 2000.

The storage unit 1700 stores the content and the relevant information about the content. In addition, the storage unit 1700 may store information about the communication channel, information about the location of the first device 1000, and information about the location of the second device 2000.

The communication unit 1800 transmits information to and receives information from the second device 2000.

The controller 1900 controls overall operations of the first device 1000, and controls the communication channel forming unit 1100, the content selection unit 1200, the relevant information acquiring unit 1300, the communication channel determiner 1400, the verification unit 1500, the data supply unit 1600, the storage unit 1700, and the communication unit 1800 so that the first device 1000 may provide the second device 2000 with at least one of the content and the relevant information about the content.

The exemplary embodiments can be implemented in digital electronic circuits, computer software, firmware, hardware including structures disclosed in the present specification or equivalent structures thereof, or combinations thereof.

The apparatuses and methods discussed above may be embodied as computer-readable codes recorded on computer-readable recording medium, which may be any available medium accessible by the computer, volatile and non-volatile media, and isolation and non-isolation type media. Also, the computer-readable medium may include computer storage media and communication media. The computer storage media may include volatile and non-volatile and isolation or non-isolation type media embodied by a certain method or technology for storing computer-readable commands, data structure, program modules, or other data. The communication media typically include computer-readable commands, data structure, program modules, or modulated data signals, or other transferring mechanisms, and may include any information transfer medium.

While the exemplary embodiments have been discussed above, it will be understood by those skilled in the art that various changes in form and details may be made therein without departing from the spirit and scope of the disclosure. The exemplary embodiments should be considered in descriptive sense only and not for purposes of limitation. Therefore, the scope of the invention is defined not by the detailed description of the invention but by the appended claims, and all differences within the scope will be construed as being included in the present invention.

While the disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transferring data from a first device to a second device, the method comprising:
 displaying or reproducing multimedia content on the first device;
 receiving, by the first device, a signal from the second device through a short-range wireless communication while displaying or reproducing the multimedia content;
 transferring, from the first device to the second device, both the multimedia content and metadata of the multimedia content when (i) the signal is received and (ii) the multimedia content is being displayed or reproduced,
 wherein the multimedia content is displayed or reproduced in both the first device and the second device, and
 wherein the transmitted metadata of the multimedia content is used by the second device for performing at least one procedure on the multimedia content.

2. The method of claim 1, the method further comprising:
 receiving, by the first device, information regarding a plurality of applications for displaying or reproducing multimedia content installed in the second device; and
 selecting, by the first device, an application from among the plurality of applications installed in the second device,
 wherein the procedure is for i)executing the selected application and ii)displaying or reproducing the multimedia content by using the selected application.

3. The method of claim 2, wherein the metadata of the multimedia content indicates the application that reproduces the multimedia content.

4. The method of claim 1, wherein the second device is a printer, and wherein the procedure comprises the printer printing the multimedia content.

5. The method of claim 2, wherein the metadata of the content comprises a link for downloading the selected application that reproduces the multimedia content.

6. The method of claim 5, wherein the procedure comprises:
 downloading the selected application based on the link; and
 the second device displaying or reproducing the multimedia content using the selected application.

7. The method of claim 1, wherein the transferring comprises transferring the multimedia content and metadata of the multimedia content using a WIFI (wireless fidelity) communication.

8. The method of claim 1, wherein the transferring comprises:
 determining a size of the multimedia content;
 selecting a communication protocol based on the size of the multimedia content; and
 transferring the content and metadata of the multimedia content using the communication protocol.

9. The method of claim 8, wherein the selecting comprises selecting the communication protocol based on the size of the multimedia content and a bandwidth of the communication protocol.

10. The method of claim 1, wherein the transferring comprises:
 selecting a plurality of communication protocols;
 segmenting at least one of the multimedia content and metadata of the multimedia content based on the plurality of communication protocols; and
 transferring the segmented at least one of the multimedia content and metadata of the multimedia content using the plurality of communication protocols.

11. A first device comprising:
 a memory configured to store at least one program; and
 a processor configured to provide data from the first device to a second device by executing the at least one program, wherein the at least one program comprises commands for:

displaying or reproducing multimedia content on the first device;

receiving a signal from the second device through a short-range wireless communication while displaying or reproducing the multimedia content;

transferring, from the first device to the second device, both the multimedia content and metadata of the multimedia content when (i) the signal is received and (ii) the multimedia content is being displayed or reproduced, wherein the multimedia content is displayed or reproduced in both the first device and the second device, and wherein the transmitted metadata of the multimedia content is used by the second device for performing at least one procedure on the multimedia content.

12. The first device of claim 11, wherein the at least one program further comprises commands for:

receiving information regarding a plurality of applications for displaying or reproducing multimedia content installed in the second device; and selecting an application from among the plurality of applications installed in the second device, wherein the procedure is for i)executing the selected application and ii)displaying or reproducing the multimedia content by using the selected application.

13. The first device of claim 12, wherein the metadata of the multimedia content indicates the application that reproduces the multimedia content.

14. The first device of claim 11, wherein the second device is a printer, and wherein the procedure comprises the printer printing the multimedia content.

15. The first device of claim 12, wherein the metadata of the content comprises a link for downloading the selected application that reproduces the multimedia content.

16. The first device of claim 15, wherein the procedure comprises:

downloading the selected application based on the link; and the second device displaying or reproducing the multimedia content using the selected application.

17. The first device of claim 11, wherein the transferring comprises transferring the multimedia content and metadata of the multimedia content using a WIFI (wireless fidelity) communication.

18. The first device of claim 11, wherein the transferring comprises:

determining a size of the multimedia content;

selecting a communication protocol based on the size of the multimedia content; and transferring the content and metadata of the multimedia content using the communication protocol.

19. The first device of claim 18, wherein the selecting comprises selecting the communication protocol based on the size of the multimedia content and a bandwidth of the communication protocol.

20. At least one non-transitory computer-readable recording medium for storing a computer program configured to be readable by at least one processor for instructing the at least one processor to execute a computer process for performing the method of claim 1.

* * * * *